(12) United States Patent
Hild et al.

(10) Patent No.: US 9,852,567 B2
(45) Date of Patent: Dec. 26, 2017

(54) LOCKING UNIT, HOUSING WITH LOCKING UNIT, AND METHOD FOR UNLOCKING ONE OR MORE DOORS OF THE HOUSING

(71) Applicants: Horst Hild, Mainhausen (DE); Christian Carstens, Windhagen (DE); Christoph Dautz, Bonn (DE); Ramin Benz, Bonn (DE); Jochen Jansen, Bonn (DE); Alexandra Dmitrienko, Darmstadt (DE)

(72) Inventors: Horst Hild, Mainhausen (DE); Christian Carstens, Windhagen (DE); Christoph Dautz, Bonn (DE); Ramin Benz, Bonn (DE); Jochen Jansen, Bonn (DE); Alexandra Dmitrienko, Darmstadt (DE)

( * ) Notice: Subject to any disclaimer, the term of this patent is extended or adjusted under 35 U.S.C. 154(b) by 0 days.

(21) Appl. No.: 15/164,711

(22) Filed: May 25, 2016

(65) Prior Publication Data
US 2016/0265253 A1    Sep. 15, 2016

Related U.S. Application Data

(63) Continuation of application No. PCT/EP2014/076561, filed on Dec. 4, 2014.

(30) Foreign Application Priority Data

Dec. 5, 2013   (DE) .................. 10 2013 113 554
Apr. 11, 2014  (DE) .................. 10 2014 105 246

(51) Int. Cl.
*G07C 9/00*    (2006.01)
*H04W 56/00*   (2009.01)
(Continued)

(52) U.S. Cl.
CPC ....... *G07C 9/00896* (2013.01); *A47G 29/141* (2013.01); *A47G 29/16* (2013.01);
(Continued)

(58) Field of Classification Search
CPC ............. E05B 65/5246; E05B 65/0003; E05B 47/0001; E05B 63/14; E05B 63/143;
(Continued)

(56) References Cited

U.S. PATENT DOCUMENTS 1,910,550 A   5/1933   Kaser
2,227,803 A   1/1941   Bales
(Continued)

FOREIGN PATENT DOCUMENTS

CN    1378676 A    11/2002
CN    1440251 A     9/2003
(Continued)

OTHER PUBLICATIONS

JH. Song et al., Request for Comments (RFC) Document 4493, The AES-CMAC Algorithm, Jun. 2006, 20 pages, Network Working Group, The Internet Society, WA.
(Continued)

*Primary Examiner* — Laura Nguyen
(74) *Attorney, Agent, or Firm* — Reinhart Boerner Van Deuren P.C.

(57) ABSTRACT

Provided is a housing with at least two doors for locking respective housing openings, comprising: a locking unit, which, for each of the doors, has a respective locking-element module with at least one locking body and with a locking drive for actuating the locking body, wherein the locking drive for the locking-element modules has a common drive element, which can be moved and moves the locking body/bodies for just one of the doors into an unlocking setting and, in a second adjustment position,
(Continued)

moves the locking bodies for all of the doors into an unlocking setting; or locking units, wherein one or more respective locking units can be activated for unlocking the associated door of the at least two doors of the housing, and respective locking units can be activated for unlocking all of the associated doors of the at least two doors of the housing.

35 Claims, 7 Drawing Sheets

(51) Int. Cl.
| | |
|---|---|
| H04L 29/06 | (2006.01) |
| G06F 1/12 | (2006.01) |
| H04L 9/08 | (2006.01) |
| G06F 1/24 | (2006.01) |
| H04W 12/08 | (2009.01) |
| A47G 29/14 | (2006.01) |
| A47G 29/16 | (2006.01) |
| G07F 17/12 | (2006.01) |
| G06Q 10/08 | (2012.01) |
| H04L 9/32 | (2006.01) |
| H04L 9/00 | (2006.01) |
| E05B 43/00 | (2006.01) |
| E05B 65/00 | (2006.01) |
| E05B 47/00 | (2006.01) |
| E05B 65/52 | (2006.01) |
| E05C 9/08 | (2006.01) |
| E05C 9/18 | (2006.01) |
| H04L 9/14 | (2006.01) |
| H04L 9/30 | (2006.01) |
| G06F 1/10 | (2006.01) |
| G06F 21/31 | (2013.01) |
| H04L 7/00 | (2006.01) |
| H04W 4/00 | (2009.01) |
| G06F 1/04 | (2006.01) |
| H04L 9/06 | (2006.01) |

(52) U.S. Cl.
CPC ........ *E05B 43/005* (2013.01); *E05B 47/0001* (2013.01); *E05B 65/0003* (2013.01); *E05B 65/0078* (2013.01); *E05B 65/5246* (2013.01); *E05C 9/08* (2013.01); *E05C 9/18* (2013.01); *G06F 1/10* (2013.01); *G06F 1/12* (2013.01); *G06F 1/24* (2013.01); *G06F 21/31* (2013.01); *G06Q 10/083* (2013.01); *G06Q 10/0836* (2013.01); *G07C 9/00* (2013.01); *G07C 9/00111* (2013.01); *G07C 9/00119* (2013.01); *G07C 9/00182* (2013.01); *G07C 9/00309* (2013.01); *G07C 9/00817* (2013.01); *G07C 9/00904* (2013.01); *G07C 9/00912* (2013.01); *G07F 17/12* (2013.01); *H04L 7/0012* (2013.01); *H04L 9/00* (2013.01); *H04L 9/08* (2013.01); *H04L 9/0819* (2013.01); *H04L 9/14* (2013.01); *H04L 9/302* (2013.01); *H04L 9/3242* (2013.01); *H04L 9/3247* (2013.01); *H04L 9/3249* (2013.01); *H04L 63/045* (2013.01); *H04L 63/062* (2013.01); *H04L 63/10* (2013.01); *H04W 4/008* (2013.01); *H04W 12/08* (2013.01); *H04W 56/001* (2013.01); *A47G 2029/149* (2013.01); *G06F 1/04* (2013.01); *G07C 2009/0092* (2013.01); *G07C 2009/00373* (2013.01); *G07C 2009/00412* (2013.01); *G07C 2009/00468* (2013.01); *G07C 2009/00642* (2013.01); *G07C 2209/08* (2013.01); *G07C 2209/63* (2013.01); *G07C 2209/64* (2013.01); *H04L 9/0637* (2013.01); *H04L 9/088* (2013.01); *H04L 2209/805* (2013.01)

(58) Field of Classification Search
CPC .............. E05B 57/00; E05C 9/00–9/24; E05C 19/002; E05C 19/10; E05C 3/00; E05C 3/006; E05C 3/008; E05C 3/045; E05C 5/02; A47G 29/14–29/30; Y10S 292/21; Y10S 292/68; H04W 12/04; H04W 12/06; G07C 9/00103; G07C 9/00412
USPC ..... 292/44, 45, 53, 54, 95, 96, 99, 194, 198
See application file for complete search history.

(56) References Cited

U.S. PATENT DOCUMENTS

| | | | |
|---|---|---|---|
| 2,417,167 A | 3/1947 | Johnston | |
| 2,486,460 A * | 11/1949 | Bonenberger | ...... E05B 65/0003 292/34 |
| 2,887,735 A | 5/1959 | Coffey | |
| 4,470,276 A | 9/1984 | Bayless | |
| 4,957,334 A | 9/1990 | Lakso | |
| 5,641,215 A | 6/1997 | Pochet | |
| 6,131,423 A | 10/2000 | Xenaki et al. | |
| 6,895,507 B1 | 5/2005 | Teppler | |
| 8,020,950 B2 | 9/2011 | Reuter et al. | |
| 8,282,175 B2 | 10/2012 | Herper et al. | |
| 2005/0006452 A1* | 1/2005 | Aupperle | ........... A47G 29/1216 232/45 |
| 2006/0006773 A1 | 1/2006 | Guebre-Tsadik et al. | |
| 2006/0226664 A1 | 10/2006 | Edwards et al. | |
| 2009/0084836 A1* | 4/2009 | Dudley | ................ A47G 29/124 232/34 |
| 2009/0217714 A1 | 9/2009 | O'Leary et al. | |
| 2012/0213362 A1* | 8/2012 | Bliding | ............. G07C 9/00309 380/44 |

FOREIGN PATENT DOCUMENTS

| | | | |
|---|---|---|---|
| CN | 102677987 A | 9/2012 | |
| DE | 20 2011 101 134 U1 | 8/2011 | |
| DE | 20 2012 012 010 U1 | 3/2013 | |
| EP | 0 698 706 A1 | 2/1996 | |
| FR | 2 770 117 A1 | 4/1999 | |
| FR | 2 836 805 A1 | 9/2003 | |
| FR | 2836805 A1 * | 9/2003 | ......... A47G 29/1201 |
| WO | WO 01/95772 A2 | 12/2001 | |

OTHER PUBLICATIONS

H. Krawczyk et al., Request for Comments (RFC) Document 2104, HMAC: Keyed-Hashing for Message Authentication, Feb. 1997, 11 pages, Network Working Group, NY.

* cited by examiner

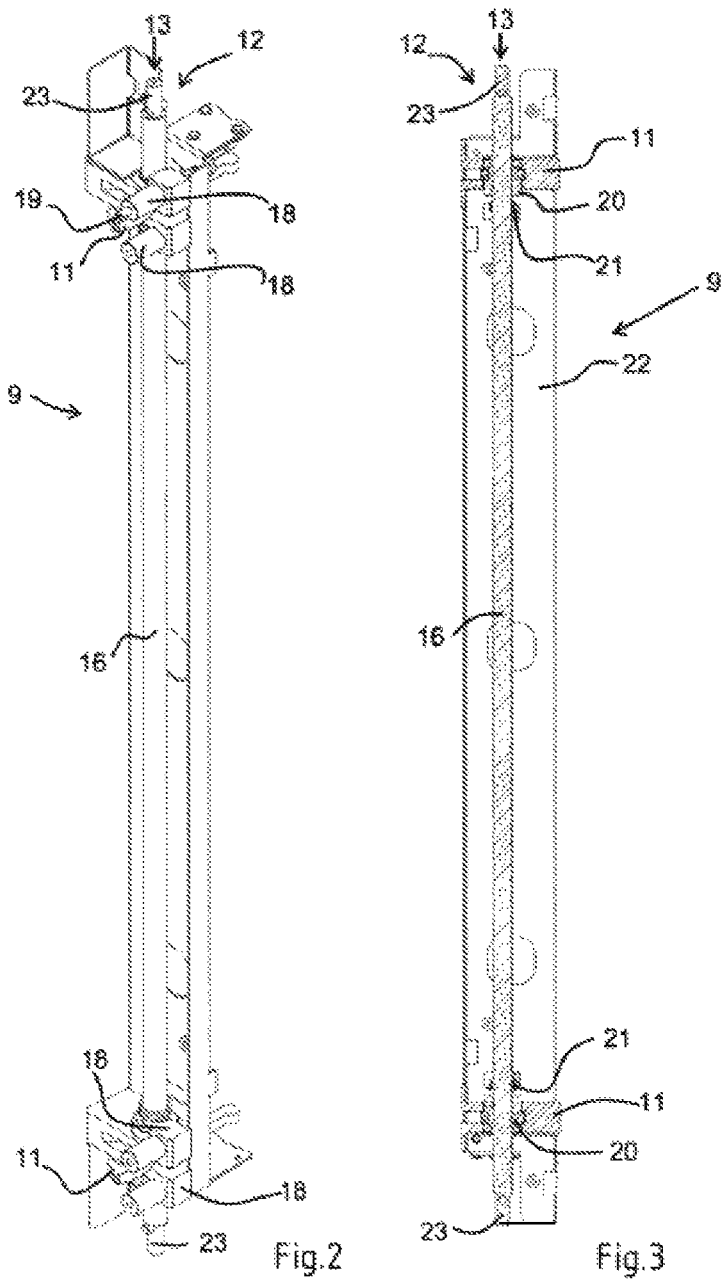

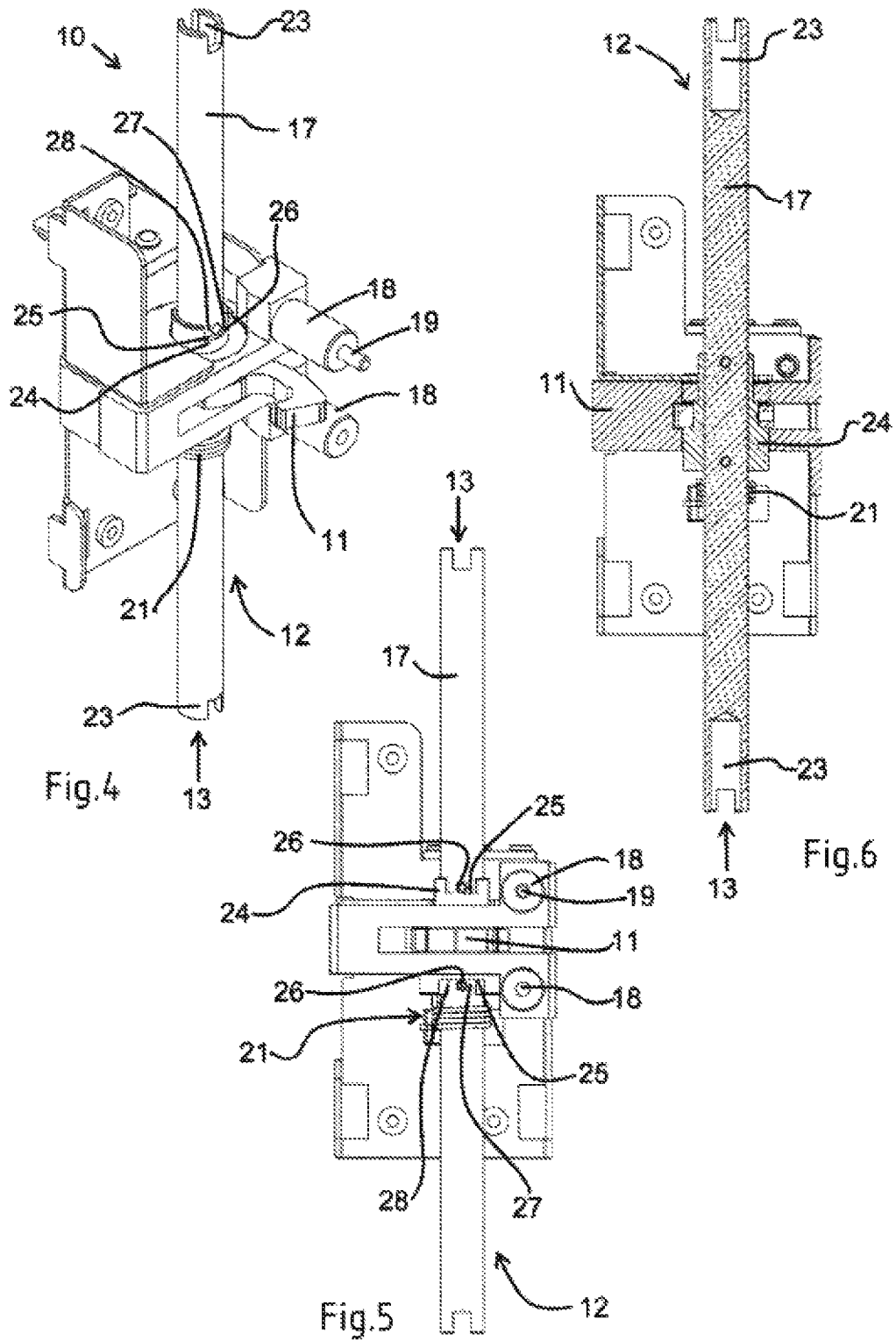

LOCKING UNIT, HOUSING WITH LOCKING UNIT, AND METHOD FOR UNLOCKING ONE OR MORE DOORS OF THE HOUSING

CROSS-REFERENCE TO RELATED PATENT APPLICATIONS

This patent application is a continuation of PCT/EP2014/076561, filed Dec. 4, 2014, which claims priority to German Application No. 10 2013 113 554.4, filed Dec. 5, 2013, and German Application No. 10 2014 105 246.3, filed Apr. 11, 2014, the entire teachings and disclosure of which are incorporated herein by reference thereto.

FIELD OF THE INVENTION

The invention relates to a locking unit for a housing, in particular for a receptacle for objects, having at least two doors for locking respective housing openings, in particular leading to storage compartments. The housing with the storage compartments may be, according to one particularly preferred embodiment, a parcel box or a parcel mailbox for accommodating letters and parcels which are to be delivered and in which the first housing opening opens into a first storage compartment for parcels, and the second housing opening opens into a second storage compartment for letters. These two storage compartments can each be locked by means of a door, wherein the door of the second storage compartment has a slot for inserting letters without opening the door of the storage compartment. In contrast, in order to place a parcel in the first storage compartment, the door of this first storage compartment must be open. The invention also relates to a housing having a locking unit according to the invention and a method for unlocking one or more doors of a housing according to the invention.

BACKGROUND OF THE INVENTION

Owing to the increasing use of e-commerce and of online mail order business, the number of parcels sent in the mail has risen significantly. A significant target group of this Internet business is made up of employed people who appreciate, in particular, the convenience and the independence from the opening times of retail outlets. However, these advantages become fully effective only when the goods which are ordered online can also be conveniently delivered. However, home delivery poses problems particularly for the target group of employed people because the customers making the orders are frequently not at home at the time of delivery.

Against this background, it is desirable to provide, in addition to the normal delivery of letters in letter mailboxes with slot-shaped openings for the insertion of the letters, also a possibility which is independent of the presence of the receiver, so that relatively large shipments such as small packets or parcels can be delivered.

For this purpose, large collection stations are already known which have a plurality of storage compartments in which a mail delivery agent can place the parcels. After users of the collection stations have received appropriate notification from the delivery agent and have proven their identity at the collection station, they can open the corresponding storage compartment and remove the parcel. A corresponding system is described, for example, in DE 20 2011 101 134 U1. However, disadvantages of these collection stations are the expenditure on their administration and collection of the parcels for the user, who has to walk or drive specially to a collection station in order to actually receive the parcels which are delivered to him.

In particular for reasons of convenience for the user it is desirable also to provide delivery possibilities in a substantially more decentralized fashion, for example in each case separately for a specific recipient. In this context, it is known from DE 20 2012 012 010 U1 to provide devices for accommodating shipments of all types, which devices are constructed from a combination of at least one letter mailbox with an insertion slot which is accessible from the outside, at least one lockable letter mailbox door for removing the letters and at least one parcel compartment with a lockable parcel compartment door. However, here the door of the parcel compartment and the door of the letter mailbox are provided with separate locks, which entails the disadvantage that at least the owner of the device has to keep two different key systems available for the access to the parcel compartment and letter compartment.

BRIEF SUMMARY OF THE INVENTION

The object of the present invention is therefore, inter alia, to provide a locking unit for a housing, in particular a parcel mailbox, the housing itself and a method for unlocking one or more doors of the housing, wherein safe storage of delivered parcels and parcels which are to be collected is made possible without the letter compartment also necessarily having to be opened when the delivery agent deposits parcels in the parcel compartment or collects them from said compartment. The system should preferably be of modular design, in order to be able to permit compatible and favorable composition of the housing, in particular with the parcel mailbox, according to individual customer requirements. This object is achieved with the features of claims 1, 12 and 16.

A locking unit is provided for this purpose which respectively has, in a manner known per se, for each door a locking element module with at least one locking body, in particular in the form of a closing hook, and a locking drive for actuating the locking body or bodies. In this context, a door is, for example, assigned in each case to a housing opening, for example to a storage compartment, in each case, and can, for example, be moved into a position in which it closes the respective housing opening.

In order to achieve simple handling, the invention proposes that the locking drive for the, in particular two, locking element modules (or else for each locking element module of the housing) has a common drive element which by is movable by an adjustment distance, and in a first adjustment position moves the locking body or bodies for merely one of the doors or merely a first group of doors of the doors into an unlocking position, and in a second adjustment position moves the locking bodies for all of the doors into an unlocking position.

When there are more than two doors, therefore, for example, a first group of doors of the doors and a second group of doors of the doors are provided, wherein the first group of doors can be unlocked together but separately from the second group of doors, and wherein the second group of doors can only be unlocked together with the first group of doors. In other words, therefore either the first group of doors or all the doors of the first and second group of doors can be unlocked, which in the event of the housing having only the first group of doors and the second group of doors as doors means that all the doors of the housing are unlocked.

However, it is also conceivable for one or more doors of the housing not to be assigned to the locking unit in accordance with the invention. Then, for example, only the locking drives of the locking element modules of two doors of the housing have a common drive element, with the result that either one of the two doors (first adjustment position) or both doors can be moved together (second adjustment position) into an unlocking position, while one or more further doors of the housing (for example with respective locking element modules or even without them) can be locked and/or unlocked independently of the drive element, for example by means of a separate mechanical or electronic lock.

According to one preferred embodiment, precisely two doors are provided in the housing and precisely two locking element modules are respectively provided in the locking unit. In this embodiment, the first door can therefore be opened separately from the first storage compartment or generally the first housing opening. If the second door is also to be opened, it is necessary to open both doors simultaneously.

The first door is therefore suitable for a housing opening which closes a storage compartment for parcels. A delivery agent can place a parcel in this compartment and/or collect a parcel which has been deposited there, by moving the common drive element into a first adjustment position in which only the first door to the parcel compartment opens. For the user of the parcel mailbox (for example the owner thereof) who would like to collect the delivered letters and parcels, the common drive element is moved, preferably through further movement, into the second adjustment position in which both the first door and the second door open, with the result that the user can remove both letters and parcels from the parcel mailbox. In contrast, the parcel delivery agent is not provided with access to the letter compartment.

In the course of this preferred embodiment, reference is made, where appropriate, only to the first or second door. Correspondingly, first and second components of the locking unit respectively refer to the first and the second door. However, insofar as more than two doors are present, these first and second components may also refer to the group of a plurality of first and second doors or locking element modules.

According to one particularly preferred embodiment of the locking unit which is proposed according to the invention, the common drive element can be embodied as a rotatable axle, in particular in the form of a rod. The proposed rotatable axle has first and second rod parts which can be releasably secured to one another in such a way that first and second rod parts rotate together. Each, i.e. one or, if appropriate, also multiple, locking bodies are non-movably secured to the or to each first rod part, i.e. are securely fixed to the first rod part. In contrast, each locking body is mounted on the or on each second rod part so as to be rotatable itself about the rotatable axle with a defined amount of play. This means that the locking body is mounted so as to be rotatable not only with respect to a bolt element of the door, which is to be unlocked, but also with respect to the rotatable axle.

Each rod part of the first and second rod parts therefore essentially forms the locking drive of a locking element module for precisely one door. In other words, in each case a rod part is assigned to a locking element module for a door. The closing and opening functions of the locking element module are therefore determined according to whether the rod part is a first or a second rod part.

A locking body which is rotatably mounted on the second rod part is also moved along only when the play in the adjustment distance of the drive element is exceeded. Only then does the other/second storage compartment open. As a result, when the rotatable axle rotates, opening of the first storage compartment is therefore firstly brought about, and when the rotatable axle rotates further, opening of the second storage compartment is additionally brought about. If appropriate, multiple first and/or second rod parts, which can be respectively releasably secured to one another, can be of modular design, wherein each rod part is preferably assigned to precisely one door. As a result, a relatively simple modular design of the locking unit is achieved, which design permits easy adaptation to customer requests and can be adapted to various parcel mailboxes or other housings which are, where appropriate, of modular design themselves.

If appropriate, a housing opening can also be of such a size that it is closed by a plurality of doors. Alternatively, it is also possible to provide that more than two housing openings are provided, wherein each housing opening is closed by means of doors which are respectively associated with the first or the second group of doors.

From these various conceivable embodiments it can be inferred that although the use of the locking unit proposed according to the invention can be particularly preferably effected in conjunction with a parcel mailbox, it is not restricted to this application but can instead be used generally in housings which have openings which can be closed with doors and which are to be opened in steps—depending on their association with a first or second group of doors.

In order to simplify the handling, it is possible to provide according to the invention that at least one of the locking element modules is embodied as a snap-action closure. This can preferably apply to all, but, if appropriate, also only to some, of the locking element modules. The snap-action closure is to be understood as being a latch-like means of locking a door, which locks the door automatically when it closes.

This preferably means that the locking bodies of the locking element modules are prestressed in the closing direction and are forcibly moved out of the closing position during the movement of an opened door into the closed position, by a bolt element which is present on the door and with which the locking body interacts in order to lock the door, so that after the door has been moved into the closed position said locking bodies engage around the bolt element (snap it in) and lock the door in the closed position.

If a door which is locked by a locking element module to a first rod part and to which the locking body is fixedly, i.e. non-movably, secured, is opened, the rotatable axle which is embodied as a common drive element also rotates when the locking body is deflected during the closing of the door by means of a snap-action closure.

In order to avoid the locking body or closing hook snapping in again before the door is opened after an unlocking movement, according to one preferred embodiment of the invention there can be provision that at least one locking element module (but likewise also a plurality or all) of the locking element modules has at least one ejection ram, prestressed in the opening direction, for automatically opening the door when the door is unlocked. Therefore, as soon as the locking body releases the bolt element of the door, the door is automatically opened by the ejection ram which is driven by the prestress. In contrast, closing the door requires force to be applied inter alia against the prestress of the ejection ram.

The provision of such an ejection ram according to the invention also has the advantage that when the door is not locked during a desired closing process the door opens again immediately if the locking body does not reliably hold the bolt element of the door. This is perceived immediately by the person closing the door, with the result that the door can once again be pushed to with increased force by this person. This largely avoids incorrect operations.

According to one preferred embodiment of the invention, the locking body which is rotatably mounted on the second rod part can have a bearing sleeve with a cutout, which bearing sleeve is movably guided on the rotatable axle, wherein a bolt which protrudes radially from the axle (rotatable axle) of the common drive element engages in the cutout in the bearing sleeve and as a result defines the play with respect to the rotation of the bearing sleeve on the axle. The section of the common drive element which is described here can therefore be formed, in particular, by the second rod part.

The bearing sleeve preferably has two cutouts at the opposite axial ends of the bearing sleeve, in each of which a pin engages which protrudes radially from the axle. This causes the bearing sleeve to be axially secured by the pins which engage in the cutouts, and at the same time the play with respect to the rotation of the bearing sleeves on the axle is predetermined by the cutouts in which the pins are accommodated. In addition, on one side, in each case two cutouts can be embodied in the longitudinal direction of the radially protruding pin, at an axial edge of the bearing sleeve, as it were on the front side and the rear side of the axle, which sides are defined by the passage of the radially protruding pin.

In this context there can preferably be provision for the pin which protrudes radially from the axle to be accommodated in the locking position of the locking body, fixedly secured on the bearing sleeve, in a central region of the cutout which defines the play for the rotation of the bearing sleeve on the axle.

In order to open the door, the locking body which is secured to the sleeve must therefore be disengaged from the bolt element of the door by rotating by means of the common drive element (rotatable axle or the second rod part thereof). If the rod which forms the drive element (rotatable axle) is rotated, the pin firstly moves in the cutout in the bearing sleeve without the bearing sleeve and the locking body also rotating. The door which is locked by the second rod part remains locked for as long as this occurs. During this play in the second rod part, a locking body which is secured in a non-movable fashion at the first rod part of the rotatable axle already rotates, with the result that this locking body disengages from the bolt element of the first door, which is therefore unlocked without the door which is unlocked by the locking element module described above with the second rod part also being unlocked.

If the pin impacts against the edge of the cutout in the bearing sleeve of the second rod part, i.e. the play which is provided by the cutout is used up, the bearing sleeve also rotates with the further rotation of the rotatable axle, with the result that the locking body which is fixedly connected to the bearing sleeve is also disengaged from the bolt element of the door and as a result this second door is also unlocked.

With the present invention it is therefore easily possible to unlock, by means of only one drive with a common drive element, first and second groups of doors which close housing openings in such a way that when the drive element is actuated for a specific movement distance, i.e. into a first adjustment position, only one group of doors, which can also be referred to as a first group, opens, and when there is a continuing movement of the drive element into a second adjustment position the other group of doors, here also referred to as a second group of doors, also additionally opens.

Such a locking unit is particularly well suited for a parcel mailbox for accommodating letters and parcels which are to be delivered, with a housing with precisely one first housing opening into a first storage compartment for parcels and with precisely one second housing opening into a second storage compartment for letters, wherein the two storage compartments can be locked by means of one door each. The door of the second storage compartment has a slot for inserting letters without opening the door of the second storage compartment, with a result that the postal worker can deliver letters in the known fashion simply by inserting them into the second storage compartment. This second storage compartment therefore constitutes a conventional letter mailbox.

If, in contrast, a parcel or small packet is to be delivered, the delivery agent can move the drive element, for example by inputting or transmitting a suitable code or some other type of authentication, to just such an extent that the door is opened for the storage compartment for parcels. He then puts the parcel into the housing and, after putting the parcel into the housing, presses the door of the storage compartment to again, and said door locks again owing to the snap-action closure.

The user (for example the owner) of the parcel mailbox opens the doors of both the first and the second storage compartments, for example by inputting or transmitting a suitable code or some other kind of authentication, in that the drive element is moved so far or for so long that both doors open. After the removal of parcels from the first storage compartment and/or letters from the second storage compartment, the user can also easily close and lock both doors again by pressing them to, since both doors are locked by corresponding snap-action closures.

In this context, the locking body is pressed in the opening direction by the locking element of the doors. For this purpose, the play which has already been described in the bearing sleeve is also provided in the other direction in the receptacle, with the result that the pin which protrudes radially from the rotatable axle (common drive element) can be deflected in the cutout. For the rotatable axle itself, which is also rotated when a first door is pressed back by the locking body which is fixedly connected to the rotatable axle, a corresponding play is provided, for example in the coupling to a drive.

According to the invention, according to one preferred embodiment of the present invention the common drive element, that is to say, in particular, the rotatable axle, can be connected to a drive which can preferably be actuated electrically via a coupling with or without a transmission. The drive preferably has an electric motor with a corresponding controller.

The controller or a processor can contain authorization checking means which evaluate authorization information received, for example, by means of radio technology (or information generated by using authorization information), in order to check for the presence of authorization for unlocking one or more doors. As a result, destruction-free external access is largely ruled out. The access to the parcel mailbox can take place, for example, by means of Near-Field-Communication (NFC) and/or Radio Frequency Identification (RFID) radio technology. This approach is intended to perform wireless communication between a parcel mailbox and a person-identification means (for example a token or tag on which the authorization information, for example a code or electronic key, is stored). This is done, for example, by means of access electronics in which a delivery agent merely has to use an RFID or NFC tag or an RFID/NFC-enabled hand-held scanner (that is to say a portable device for optically capturing barcodes) with the authorization information, and he is therefore relieved of the need to carry a separate bunch of keys with physical keys or the like. In addition, the customer, that is to say the owner of the mailbox, is provided at any time with access to his parcel mailbox and therefore to his parcel or to the letters at his front door. This access can be realized by means of an RFID or NFC tag (for example as a key fob clip) or an application (App) which can be implemented, for example, on a cell phone.

Even if the electronic authentication which is based on radio technology, as described above, may be preferred according to the invention, a drive according to the invention can also take place mechanically, for example by means of a physical key for releasing rotational elements which are under prestress. The prestress of rotational elements can be built up once more, for example, whenever the doors close.

If a locking element module is embodied with a first rod part as a snap-action closure, the common drive element also rotates, as already mentioned, when the door closes counter to the prestressing direction. In this case, a corresponding play counter to the opening movement of the common drive element is to be provided in the coupling element between the common drive element and the drive. This can be achieved in a corresponding way by a person skilled in the art, for example as described above for the locking body, mounted with defined play by the rotatable axle (common drive element), in the case of the second rod part.

In order to be able to bring about locking of the door in a simple way, after the movement for opening the doors, for example by means of the drive or a mechanical restoring mechanism, the common drive element can be moved back into the home position which corresponds to the locking position of the locking bodies and in which the snap-action closure can act easily. Sensors for detecting the movement position of the drive element, i.e. the rotatable axle, can be provided, for example, by means of a change in magnetic field in the coupling of the drive element to the drive. The detection of position can then be performed by means of a magnet with a suitable magnetic field sensor, for example a Hall sensor.

According to the invention, one or more locking bodies can be arranged in an axial direction on a rod part in a mirror-symmetrical fashion with respect to the horizontal central axis of the rod part. That is to say, the locking bodies on both halves of the rod part are arranged symmetrically with respect to the center of the rod part. When there is only one locking body or an uneven number of locking bodies, a locking body is respectively provided in the center of the rod part. An even number, or the, if appropriate, remaining even number of locking bodies after a locking body has been mounted in the center, is then respectively distributed symmetrically about the center by means of the rotatable axle. As a result it is ensured that each rod part can, by means of rotation through 180°, be used, as it were, for movement of the doors to a right-hand stop or left-hand stop, because the locking bodies interact with the bolt elements of the doors into every possible mounting position of the rod parts in which they are rotated through 180°.

In addition, with respect to a simple modular design of the locking body according to the invention, couplings with coupling pieces can be provided on the first and second rod parts, in each case at the ends, which coupling pieces are designed so as to be symmetrical about the horizontal central axis of the rod part and bring about coupling of the various rod parts in such a way that the rotatable rod which is formed by the various rod parts serves as a common drive element. This also permits simple right-hand or left-hand exchangeability in the case of modular coupling of the first and second rod parts.

Particularly simple mounting can be achieved if a mounting carrier, for example in the form of a mounting plate, is provided, on which the locking element modules are mountable each rotating through 180° with respect to the axial direction of the common drive element. In this case, all the parts of the locking unit can be used with identical designs for movement of the doors to a right-hand stop or left-hand stop.

The proposed mechanical solution of the locking unit is therefore distinguished, in particular, by the fact that it requires only one drive which actuates a common locking linkage (rotatable axle) for all the doors and nevertheless permits only certain doors (of the first group) to be locked, while other doors (of the second group) still remain closed. Furthermore, all the doors can be closed or locked independently of one another and in a desired sequence, since in this respect only snap-action closures are provided without the common drive element having to be controlled and rotated selectively for this purpose. In addition, all elements of the locking unit can be embodied in such a way that they provide simple right-hand-left-hand exchangeability of the doors in the housing for closing off the housing openings.

The object of the present invention is also achieved by means of a housing having at least two doors for locking respective housing openings, in particular leading to storage compartments, wherein the housing comprises a locking unit according to the invention. The exemplary embodiments of the locking unit according to the invention, their individual features and their advantages as described above are therefore also be understood as being disclosed for the housing according to the invention.

An exemplary embodiment of the housing according to the invention comprises authorization checking means for checking the respective authorization of persons (for example of one or more delivery agents or an owner of the housing) to unlock one or more of the doors of the housing, on the basis of authorization information which is respectively used by the persons when providing proof of authorization, and control means for controlling a drive assigned to the common drive element depending on the result of the check of the authorization checking means, with the result that the common drive element assumes the first adjustment position if first authorization information was used when providing proof of authorization, and assumes the second adjustment position if second authorization information was used when providing proof of authorization.

The authorization checking means can be formed, for example, by means of a processor, for example by means of a microprocessor, a DSP (Digital Signal Processor) or a FPGA (Field Programmable Gate Array), to give just a couple of non-restrictive examples. The authorization checking means can be stored, for example, as computer program instructions in a memory of the processor and executed by the processor when the computer program runs with these instructions on the processor.

The authorization information can comprise, or consist of, for example, a code (for example a numerical code, letter code or combined numerical/letter code, for example an identifier of an electronic appliance such as, for example, a tag) or an electronic key (for example a symmetrical key or a public or private key of an asymmetrical pair of keys, in particular of a public key infrastructure (PKI)—pair of keys). Asymmetrical keys can be generated, for example, according to the RSA (Rivest, Shamir, Adleman) method. An example of a symmetrical key is an AES (Advanced Encryption Standard) key. The authorization information can additionally or alternatively comprise encrypted information or consist thereof. For example, the authorization information can comprise, or consist, of an identifier, encrypted with a key, of the housing, the unlocking of which is authorized by the authorization information (and optionally further information which is encrypted with the key, for example a time at which the authorization information was generated and/or a random number, for example for preventing replay attacks and/or information relating to the validity period of the authorization information). The housing then has, for example, the same key or a corresponding key (or can generate said key) for decrypting the encrypted identifier (and, if appropriate, the further encrypted information) which is used for proving authorization vis-à-vis to the housing, and said housing can then check whether the decrypted identifier (and, if appropriate, the further decrypted information) corresponds to the identifier of the housing, which is stored, for example, in the housing, (and, if appropriate, corresponding information which is stored or can be generated in the housing), and therefore the authorization for unlocking one or more doors of the housing is present.

The authorization information can additionally or alternatively contain one or more authorization characteristic variables (for example in non-encrypted form). Examples of authorization characteristic variables are an identifier of the housing or the lock thereof or an identifier of a group of housings or the locks thereof. Further examples of authorization characteristic variables is information relating to the validity period of the authorization information (for example a time at which the validity starts and a time at which the validity ends) or information as to which door or doors or group or groups of doors of a housing can be opened with this authorization information.

In addition to the one or more authorization characteristic variables, the authorization information can contain the result of a cryptographic operation with a key to at least a part (or even all) of the one or more authorization characteristic variables as a type of checking information. The part can comprise, for example, at least the identifier of the housing or the lock thereof or the identifier for a group of housings or the locks thereof. The result of the cryptographic operation can be used, for example, to check whether the non-encrypted authorization characteristic variables which were effected by the cryptographic operation have not been changed anymore since the generation of the result of the cryptographic operation or were changed only by an entity which has access to the key. Examples of the cryptographic operation are a digital signature, that is to say a hash value which was encrypted (with a (for example public) key of an asymmetrical pair of keys), using the part of the one or more authorization variables, or a message authentication code (MAC) using the part of the one or more authorization characteristic variables, for example a keyed-hash MAC (HMAC, for example according to Request for Comments Document of the Internet Engineering Taskforce (IETF) RFC 2104) or a cipher-based MAC (for example according to RFC4493). In the case of a MAC, a key is also included in the calculation of the hash value, which key can be, for example, a symmetrical key, for example an Advanced Encryption Standard (AES) key. At the recipient, the MAC can be calculated anew and compared with the received MAC given knowledge of the key or of a corresponding key using the same part of the one or more authorization characteristic variables. For example, the key or the corresponding key is stored in the housing. In the case of corresponding keys, the integrity of the part of the one or more authorization characteristic variables can be assumed.

On the basis of the authorization characteristic variables it is possible, (in particular after checking of the integrity of the authorization characteristic variables) to check whether one or more doors of the housing can be opened, for example by checking the authorization characteristic variables against reference information which is present in the housing, for example at least at the time of the checking, for example reference information which is stored in the housing, can be determined and/or was received. Therefore, for example in the case of an identifier of the housing or for a group of housings, a corresponding housing identifier or group identifier which is stored in the housing can these as a reference variable. In the case of one or more authorization characteristic variables which define a validity time period, time information which is supplied by a clock of the housing can serve as a reference variable for checking whether the point in time which is defined by the time information is still within the validity time period.

Authorization information may have been generated, for example by an administration unit, for example a server. Information relating to the production of the authorization information, for example housing identifiers and keys (but, for example, also further information, for example relating to the validity time period of the authorization information) is present at the administration unit, for example for each of the housings. The authorization information which can be used for one or more housings can then be transmitted, for example, from the management unit directly or indirectly to a portable electronic appliance (for example an RFID or NFC tag, a cell phone or a hand-held scanner), which can then be used to provide proof of authorization to open one or more doors with respect to a housing. In the case of RFID or NFC tags, the administration unit can, for example, also cause the authorization information to be already written into the tags when they are produced. The transmission of the authorization information to a cell phone of a user of the housing can be performed, for example, by an App which communicates with the administration unit, for example via a wireless link, which can for example be protected by encryption. In the case of a hand-held scanner, the authorization information can be transmitted, for example, from the administration unit either directly or via one or more intermediately connected devices, for example a computer and/or a docking station, wherein the computer is connected to the administration unit, for example, via the Internet and then transmits the authorization information for one or more housings to the hand-held scanner in a wire-connected fashion (for example via a docking station) or in a wireless fashion. The keys (for example the keys which are used to produce the MAC or the digital signature) which are contained in the authorization information or used during the generation of at least components of the authorization information are, for example, known only to the administration unit and the respective housing, but are, for example, not known to the portable electronic appliance or the user thereof. The authorization information is therefore then based on a secret (the key or the keys) which is shared between the administration unit and the housing.

The key which is used during the generation of at least parts of the authorization information as described above can be used here, for example, only during the generation (for example by encryption and/or MAC calculation and/or calculation of a digital signature of information, for example of a housing identifier) of an entity of authorization information, but not during the generation of further entities of authorization information for the same housing or further entities of authorization information at all. If the authorization information is stored, for example, on a portable electronic appliance (for example an RFID or NFC tag, a cell phone or a hand-held scanner), another key can be used, for example, to generate the authorization information for each of the electronic appliances. This key can depend, for example, on an identifier of the respective electronic appliance, that is to say, for example, can be selected or generated using the said identifier, for example by means of a predefined (but secret) algorithm. A housing can then select or generate this key (in the case of symmetrical encryption) or a corresponding key (for example in the case of asymmetrical encryption) on the basis of the identifier of the electronic appliance (which is transmitted, for example, together with the authorization information to the housing, or separately therefrom).

As a result it is advantageously ensured that the authorization information cannot be falsified or used as a simple copy together with another electronic appliance. Alternatively, in order to generate the authorization information for each of the electronic appliances or at least one group of two or more electronic appliances it is possible to use the same key, therefore then only this key or a corresponding key must also be used in the housing (and, for example, stored).

The respective authorization information can be assigned to at least one of the persons (or even all of them) at least temporarily, in particular for the time at which authorization is proven. The authorization information can be assigned to a person, for example, by virtue of the fact that the person has or controls a data carrier with the authorization information stored or represented thereon, at least at the time at which authorization is proven (or even continuously), or that the authorization information is stored in an electronic appliance belonging to the person, at least at the time when the authorization is proven. The data carrier may be, for example, a memory of an RFID or NFC tag, a smartcard or a label with a barcode printed on it (for example on a consignment), to give just a couple of examples. The electronic appliance may be, for example, a cell phone or a hand-held scanner of a delivery agent. The authorization information can also be assigned to the person, for example, by virtue of the fact that the authorization information was communicated to the person, for example by sending a message which contains the authorization information.

The authorization information can be used, for example, when proving the authorization by virtue of the fact that the person inputs the authorization information, or information which was generated using the authorization information, into an input unit (for example a keypad or a barcode scanner) of the housing or transmits it (in an encrypted or non-encrypted form) to a reception unit (for example an RFID or NFC reading unit) of the housing. Non-exhaustive examples of an input unit are a keypad, acoustic capture means (for example voice detection means) or optical capture means (for example a scanner, in particular a barcode scanner, wherein the authorization information or the information generated therewith is then represented in a barcode). Non-exhaustive examples of a reception means are receivers for wireless information transmission technologies such as, for example, RFID receivers, smartcard receivers, NFC receivers, Bluetooth receivers, WLAN receivers and/or cell phone receivers. The reception means may be, for example, part of combined transmission and reception means, for example that is to say part of communication means. At the input unit, the authorization information, or the information which was generated using the authorization information, can be input, for example, by typing it into a keypad, by speaking it into the acoustic capture means or by holding it in front of the optical capture means. At the reception means, the authorization information means, or the information which was generated using the authorization information, can, for example by actuating an action element (for example a pushbutton key or a switch or menu entry or a button which is represented on a graphic display unit of an electronic appliance) of a device (for example of a cell phone, hand-held scanner or hand-held transmitter) or by moving a device (for example a RFID or NFC tag or an RFID or NFC-enabled electronic appliance such as, for example, a cell phone or hand-held scanner) which stores the authorization information, to the reception means, for example into a predefined range of the reception means.

The RFID or NFC tags can be tags (for example portable elements with small dimensions in the range of, for example, a few centimeters (for example less than 5 cm) diameter or an edge length such as for example, a key fob or cards in the credit card format) with their own power supply or tags without a power supply of their own. The tags can operate, for example, at 120-135 kHz, 13.56 MHz or 865-869 MHz, but other, in particular higher frequencies, are also possible. The transmission of information can be based, for example, on capacitive coupling, inductive coupling or on electromagnetic waves (for example backscatter methods). The RFID or NFC tag can comprise, for example, an antenna, an analog circuit for transmitting and receiving (also referred to as a transceiver), a digital circuit (for example a microcontroller) and a memory (for example an EEPROM—Electrically Erasable Programmable Read-Only Memory). The authorization information is stored in the memory, for example in the form of a number or identifier (UID—Unique Identification) which can be unique, for example, for the respective tag. The authorization information can be modulated, for example in the form of a load modulation, for example onto a high-frequency signal which is generated by an RFID or NFC reading unit. The reading unit can then as a result receive the authorization information from the tag. RFID or NFC tags are specified, for example, according to the ISO standards 18000, 11784/11785 and the ISO/IEC standard 14443 and 15693, to give just a pair of non-restrictive examples.

The checking of the authorization can be performed, for example, in that the authorization checking means compare the authorization information used to prove the authorization with authorization information which is stored in a memory of the housing and, for example in the case of correspondence or a predefined correspondence of the authorization information which is used and the authorization information which is stored, come to the result that authorization is present. The checking of the authorization can alternatively also be performed by virtue of the fact that the authorization checking means process the authorization information used to prove the authorization, and compare a result of the processing with information which is stored in a memory of the housing, and in the case of correspondence or predefined correspondence come to the result that an authorization is present. The processing can, for example, comprise, or consist of, decryption, for example if the authorization information comprises, or consists of, encrypted information (for example an encrypted identifier of the housing) which is compared, after decryption, with information stored in the housing (for example the identifier of the housing). The checking of the authorization can also be performed, for example, in that the authorization checking means checks information which was generated using authorization information and was used by the person to prove the authorization, said checking being carried out using corresponding authorization information which is stored in a memory of the housing. This can be performed, for example, within the scope of a challenge-response method, during which a data sequence, for example a random data sequence, is transmitted to the person, the person applies authorization information (for example a first key for encrypting the data sequence) to the data sequence in order to prove their authorization, and transmits the result to the authorization checking means (for example by inputting it into an input unit of the housing or transmitting it to a reception unit of the housing), and the authorization checking means then apply the corresponding authorization information (for example a second key for decrypting the transmitted result) to the transmitted result, compare the result obtained in this way with the data sequence which was originally transmitted to the person, and in the case of the correspondence come to the result that authorization is present. An advantage of this method is that the authorization information does not have to be transmitted in plain text here. The first and second keys may, for example, each be identical here (as so-called symmetrical keys). Alternatively, the first and second keys can form an asymmetrical pair of keys of a PKI, wherein, for example, the first key is a public key and the second key is a private key.

If the authorization information contains one or more authorization characteristic variables and the result (for example a MAC) of a cryptographic operation using at least some of the one or more authorization characteristic variables, the checking of the authorization can be performed, for example, by virtue of the fact that the authorization checking means repeats the cryptographic operation using the one or more received authorization characteristic variables, and compares the result with the received result (in the case of an asymmetrical pair of keys, the received digital signature is instead checked using at least some of the authorization characteristic variables, for example by decrypting an encrypted hash value contained in the digital signature, local regeneration of the hash value and comparison of the two hash values). In the case of correspondence, the individual authorization characteristic variables are checked against information stored in the housing, information generated in the housing and/or information received by the housing, and in dependence thereon it is decided whether authorization to open one or more doors of the housing is present.

The control means of the housing according to the invention can constitute, for example, a drive controller which receives control signals from the authorization checking means (depending on the result of the authorization checking, that is to say, for example, whether first or second authorization information was used for proving authorization) and controls the drive (for example a motor) according to these control signals. The control means can be formed together with the authorization checking means by a processor. Alternatively, the control means can be constructed separately from the authorization checking means, for example as a driver stage for the drive.

In one exemplary embodiment of the housing according to the invention, the first authorization information is used by a delivery agent or a group of delivery agents and authorizes said agent/agents to unlock merely one of the doors or merely the first group of doors of the doors in order to permit said agent/agents to place at least one shipment in the respective housing opening or openings and/or to collect one or more shipments, in particular parcels, from the respective housing opening or openings, and the second authorization information authorizes at least one person assigned to the housing to unlock all of the doors, in order to permit said person to remove one or more delivered shipments, in particular parcels, from the housing opening or openings which is/are assigned to the door (6) or to the first group of doors, or to place one or more shipments which are to be collected, in particular parcels, in the housing opening which is/are assigned to the door or to the first group of doors, and to remove one or more delivered shipments, in particular letters, from the housing opening or openings which is/are assigned to the remaining door or doors of the doors.

The person to whom the housing is assigned is neither the delivery agent, nor does he belong to the group of delivery agents, here. The person may be, for example, someone who, for example as a customer, is making use of services provided by the delivery agent or the group of delivery agents (in which case the services are provided, for example, at least using the housing). This may be a case here of parcel services, for example. The person to whom the housing is assigned may be, for example, the owner or tenant of the housing.

For example, the delivery agent or the group of delivery agents can use the first authorization information to prove authorization, at least at the time when the authorization is proven. For example, the delivery agent (or the group of delivery agents) has at least at the time when proof is provided, a data carrier (for example an RFID or NFC tag or a hand-held scanner) in which the first authorization information is stored, or knows the first authorization information or has a consignment on which a label with a representation of the authorization information (for example in the form of a barcode or a transponder label) is applied.

Likewise, for example the person who is assigned to the housing (who is neither the delivery agent nor belongs to the group of delivery agents) can use the second authorization information to prove authorization, at least at the time when authorization is proven. For example, this person has, at least at the time when proof is provided, a data carrier (for example an RFID or NFC tag or a cell phone) in which the second authorization information is stored, or knows the authorization information.

In one exemplary embodiment of the housing according to the invention, the authorization checking means are configured to prevent the door or the first group of doors of the doors of the housing from being unlocked twice in direct succession with respective use of the first authorization information.

It may then be necessary, for example, for the second authorization information to be used for unlocking after each time the first authorization information is used for unlocking. This may serve to prevent, for example, a delivery agent who, for example, uses the first authorization information from being able to unlock the door (for example the parcel door) of the housing repeatedly, or a second delivery agent who uses, for example, the first authorization information from being able to unlock the door (for example the parcel door) of the housing after a first delivery agent who, for example, also uses the first authorization information has unlocked the door of the housing and placed a parcel in it, before the owner of the housing who uses, for example, the second authorization information, has removed the parcel which was placed in the housing. For this purpose, the authorization checking means can keep, for example, a logbook covering the authorization proving operations which have taken place and the authorization information which was used in these operations and, when authorization is proven again with the first authorization information, check whether the last provision of proof of authorization already took place with the first authorization information. If this is the case, for example the control of the control means can fail to occur (with the result that the common drive element is not moved) and instead a visual or acoustic warning can be issued.

The object according to the invention is also achieved by means of a method for unlocking one or more doors of a housing according to the invention which comprises the authorization checking means described above and the control means. The method comprises proving, vis-à-vis the authorization checking means of the housing, the authorization of a person to unlock one or more doors of the housing by using the first or second authorization information. The method, in particular the provision of proof, can be performed, for example, by the person, for example in that the person interacts with the housing or uses a device (for example an RFID or NFC tag, a hand-held scanner or a cell phone) to interact with the housing. The exemplary embodiments of the locking unit according to the invention as described above and of the housing according to the invention, the individual features and advantages relating thereto are therefore also to be understood as being disclosed for the method according to the invention.

According to one exemplary embodiment of the method according to the invention, proving the authorization comprises the following:

inputting the first or second authorization information, or information which was generated using the first or second authorization information, into an input unit of the housing (which is, for example, operatively connected to the authorization checking means, with the result that the authorization information, or the information, can be passed onto the authorization checking means), or transmitting, in particular in a wireless fashion, the first or second authorization information, or information which was generated using the first or second authorization information, to a reception unit of the housing (which are, for example, operatively connected to the authorization checking means, with the result that the authorization information, or the information, can be passed onto the authorization checking means).

An explanation of how this inputting or transmission can take place has already been given above on the basis of examples. The inputting or transmitting can be performed, for example, by the person himself or be at least initiated by the person, for example by operating/handling a device (for example an RFID or NFC tag, a cell phone or a hand-held scanner) which stores the authorization information, or, for example, by operating/handling an object (for example a parcel) which has the authorization information.

According to one exemplary embodiment of the method according to the invention, the first authorization information provides authorization for respectively unlocking, one or more doors of a plurality of housings (for example parcel mailboxes). These plurality of housings are, for example, assigned to respective different owners and/or are installed at different locations (for example at different locations in a delivery area of the delivery agent). The first authorization information can therefore provide authorization, for example, to unlock a parcel door of a first parcel mailbox as well as a parcel door of a second parcel mailbox and, if appropriate, the parcel door of one or more further parcel mailboxes, but can, for example, not respectively provide authorization to unlock letter doors. In particular, according to this embodiment, the same first authorization information (for example the (precisely) same code or key) is therefore used to unlock the one or more doors in each of the plurality of housings. This first authorization information can nevertheless have limited validity, for example a temporally limited validity. For example, the validity can be limited to one tag, which can be checked, for example, by means of the date, if, for example, the first authorization information was produced using the date or contains this date.

However, in contrast thereto, the second authorization information can provide authorization merely to unlock the doors of precisely one housing.

For example, the first authorization information (that is to say, for example, the same code or key) can then be stored in a plurality of housings (for example in the memories thereof) or provide authorization at least to open, in each case, one or more doors. This avoids the situation in which a delivery agent has to have available respective first authorization information for each housing, which would lead to a situation in which when storing the first authorization information, for example, in an RFID or NFC tag of the delivery agent, the delivery agent would have to carry with him a separate RFID or NFC tag, and respectively locate said tag for every housing in which he is to place one or more shipments.

For example, the first authorization information contains an identifier of that one or more housings for which the first authorization information is intended to be valid, wherein the identifier is embodied as a group identifier, and by means of a respective identifier stored in the housing it is possible to check whether or not the housing belongs to the group identified by the group identifier. For example, the same group identifier can be stored in all the housings of the group, or at least form part of the individual housing identifiers respectively stored in the housings of the group.

If the authorization information contains one or more authorization characteristic variables and the result of a cryptographic operation using at least part of these one or more authorization characteristic variables, it is possible, for example by means of the following procedure, to ensure that the same authorization information can be used for a plurality of housings. A group identifier of that group of housings for which the authorization information is intended to be valid is selected as one of the authorization characteristic variables. Identifiers which are associated with this identifier are stored in the housings with the group of housings in order to permit the housings to carry out, in the event of reception of the group identifier, a check as to whether the respective housing belongs to this group or not. The associated identifiers can in this context correspond, for example, to the group identifier. The housings can then have, for example, both a group identifier and an individual housing identifier. Alternatively, for example a defined part of the associated identifiers can correspond to the group identifier, for example a certain number of digits of the associated identifiers, as a result of which the associated identifiers are then, for example, still individual for each housing but correspond at least in the defined part. In addition, when the authorization information is generated, the same (for example symmetrical) key is then used for the cryptographic operation (for example an MAC of the one digital signature) which is performed at least using the group identifier, for all the housings of the group (as identified by the group identifier). Correspondingly, this key (or a key corresponding thereto, for example in the case of an asymmetrical pair of keys) must then be stored in all the housings of the group, in order to permit integrity checking of at least the group identifier which is contained in the authorization information. The same authorization information can therefore be used for a plurality of housings. Through corresponding recording of a further authorization characteristic variable which indicates which of the doors of the housing is allowed to be opened (for example only the parcel door or doors), for example the first authorization information is then from the general authorization information.

The first authorization information, which provides authorization for the respective unlocking of at least one door of a plurality of housings, can, instead of storage on an RFID or NFC tag of a delivery agent, also be stored in a portable electronic appliance of the delivery agent, for example a hand-held scanner.

According to one exemplary embodiment of the method according to the invention, the first authorization information provides authorization for respectively unlocking one or more doors of only one housing, and the first authorization information is stored, together with further first authorization information which provides authorization for respectively unlocking one or more doors of one or more further housings, on a portable electronic device, in particular on an RFID or NFC tag or on a hand-held scanner. As a result, the delivery agent is relieved of the need to carry along on his delivery route a separate portable electronic appliance with the respective first authorization information for each housing.

If the first authorization information has, as authorization characteristic variable, for example in each case a housing identifier which corresponds to the housing identifiers stored in the respective housings, the first authorization information is as a result individualized with respect to various housings. Additionally or alternatively, during the cryptographic operation (for example an MAC or a digital signature) whose result is part of the authorization information, a key which is different for each housing (either a symmetrical key which is then stored identically in the housing or a key of an asymmetrical pair of keys, of which one key is then stored in the housing) can be used, which increases the robustness of the system with respect to the discovery of the key of a housing. The respective first authorization information for the plurality of housings can, for example, be transferred onto the portable electronic device on a daily basis.

A user (for example a delivery agent) of the portable electronic appliance (for example of the hand-held scanner) can be assisted, for example, during the selection of the first authorization information, corresponding to a housing, from the first authorization information stored on the electronic appliance in that the selection is demarcated for the user. This can be done, for example, by demarcating the selection to that first authorization information which is stored in the appliance which is associated with housings in a defined surrounding area of the current location of the user.

Alternatively, information which is stored in the hand-held scanner and relates to shipments which are to be placed in the housing or collected therefrom can serve to automatically reduce the selection quantity of the first authorization information, for example by comparing a destination address (which can also be represented, for example, by a code) of the shipment with addresses of the housings which are assigned to the first authorization information (wherein these addresses can also be represented, for example, by codes). For example, a piece of information which identifies the shipment (for example an Identcode) can be captured from an shipment (for example a parcel) to be delivered by using the portable electronic device, for example optically (for example by scanning in a barcode applied to the shipment) or by means of radio signals (for example by reading out a transponder or chip arranged in or on the shipment). On the basis of this information, an associated data record relating to said shipment can then be determined in the electronic device, said data record containing, for example, a representation of the address (for example the address itself or a code for it) to which this shipment is to be delivered. Representation of the address can then be compared, in particular automatically, with a list, also stored in the portable electronic device, of representations of addresses (for example the address itself or a code for it) for housings and/or for users which are respectively assigned to the housings, in order to identify the housing for which the shipment is determined. The first authorization information of the housing which is identified in this way can then be transmitted, for example, automatically to the housing. Alternatively, the identified housing can be displayed to the user on a graphic user interface with the portable electronic device, and the user can be interrogated in a dialog as to whether he would like to transmit the first authorization information to this housing. The transmission takes place, for example, only when the user confirms this dialog by means of a user action (for example by pressing a pushbutton key or actuating a graphic element of the graphic user interface). If complete correspondence cannot be determined between the representation of the address of the shipment and a representation of the address of a housing or of a user from the list who is assigned to a housing, it is possible, for example, to display for selection to the user those housings whose representation of the address corresponds at least partially to the representation of the address of the shipment. If the representation of the address of the shipment reads, for example: "4 High Street, 40211 Düsseldorf", but the list of representations of addresses of the housings contains only "7a High Street, 40211 Düsseldorf" and "7b High Street, 40211 Düsseldorf", the housings which are assigned to these two representations of addresses are displayed to the user, so that he can select which respective first authorization information is to be transmitted to the housing.

According to one exemplary embodiment of the method according to the invention, the first authorization information has a temporally limited validity and/or becomes invalid after a predefined number of uses for proving the authorization.

At least the first authorization information can therefore have, for example, a temporally limited validity, and therefore, for example, after the expiry of a predefined time period (for example calculated starting from the outputting or the storage thereof in a data carrier) which can be, for example, several minutes, hours, days, weeks or months, or starting from a predefined end of validity time, can no longer authorize the unlocking of doors of the housing. For a delivery agent to be able to provide proof again of his authorization to unlock one or more doors of the housing after the expiry of this time period, it is necessary to receive new first authorization information. Correspondingly, the first authorization information (or the information which corresponds thereto and is used during the checking of the first authorization information) must then, where appropriate, also be updated in the housing. This can be done, for example, in that updated first authorization information is stored via an interface (for example via the reception unit of the housing) or newly determined according to a predefined algorithm (for example in a processor of the housing). The predefined algorithm corresponds here to the algorithm according to which the new first authorization information is also determined for the delivery agent. The algorithm can be, for example, secret. The algorithm can also integrate, inter alia, for example chronological information such as, for example, a date and/or a time in the first authorization information or use it during the determination of the first authorization information. Additionally or alternatively, the first authorization information can also become invalid after a predefined number of uses for proving the authorization, for example after a single use or after ten or twenty uses, to give just a couple of examples. Then, for the delivery agent it may also be necessary to obtain new first authorization information, and it may also be necessary for the first authorization information or the information which corresponds thereto and is used during the checking of the first authorization information in the housing to be correspondingly updated. The authorization information can be limited, for example, in validity by virtue of the fact that it contains authorization characteristic variables which represent this limitation of the validity and are cross-checked in the housing, for example against a current time, if the authorization information contains a validity time period as an authorization characteristic variable.

According to one exemplary embodiment of the method according to the invention, the first authorization information is used to prove the authorization.

The method can then also be a method for unlocking one or more doors of the housing and for using the housing and can comprise the following:

placing one or more shipments in the housing opening or openings which is/are respectively assigned to the one unlocked door or to the first group of unlocked doors, and/or collecting one or more shipments, in particular parcels, from the housing opening or openings which is/are respectively assigned to the one unlocked door or to the first group of unlocked doors, and closing the unlocked door or the first group of unlocked doors.

The placing/collection and the closing are then performed, for example, by the person, in particular, by a delivery agent or a group of delivery agents. The person then has, for example, only the first user information but not the second user information.

In this context, the unlocked door or the first group of unlocked doors can be locked automatically by the closing, for example by virtue of the embodiment of the locking element modules as snap-action closures, as already described above.

According to one exemplary embodiment of the method according to the invention, the second authorization information is used to prove the authorization.

The method can then also be a method for unlocking one or more doors of the housing and for using the housing and can comprise the following:

removing one or more delivered shipments, in particular parcels, from the housing opening or openings (4) which is/are assigned to the unlocked door (6) or the first group of unlocked doors (6), or placing one or more shipments which are to be collected, in particular parcels, in the housing opening (4) which is/are assigned to the unlocked door (6) or the first group of unlocked doors (6), removing one or more delivered shipments, in particular letters, from the housing opening or openings (5) which is/are assigned to the remaining unlocked door or doors (7), and closing the unlocked doors.

The removal/placing and the closing are then performed, for example, by the person, in particular by the person assigned to the housing, that is to say, in particular, an owner of the housing. The person then has, for example, only the second user information but not the first user information.

In this context, the unlocked doors can be automatically locked by the closing, for example by virtue of the embodiment of the locking element modules as snap-action closures, as already described above.

The last-mentioned two embodiments of the method according to the invention are also to be understood as disclosed as a combined method in which a person uses the first authorization information to prove their authorization and then performs the respective method steps, and a further person uses the second authorization information to prove their authorization and then performs the respective method steps.

The exemplary embodiments described above and exemplary refinements of the present invention are also to be disclosed in all combinations with one another.

BRIEF DESCRIPTION OF THE SEVERAL VIEWS OF THE DRAWING

Further advantageous exemplary refinements of the invention can be found in the following detailed description of a number of exemplary embodiments of the present invention, in particular in conjunction with the figures. However, the figures which are appended to the application are only to serve the purpose of clarification but not to determine the scope of protection of the invention. The appended drawings are not necessarily true to scale and are intended merely to reflect by way of example the general concept of the present invention. In particular, features which are contained in the figures are not in any way to be considered as a necessary component of the present invention.

In the drawings:

FIG. 2 shows a three-dimensional view of a locking element module for the first door of the parcel mailbox according to FIG. 1;

FIG. 3 shows a sectional drawing through the locking element module according to FIG. 2;

FIG. 4 shows a three-dimensional view of a locking element module for the second door of the parcel mailbox according to FIG. 1;

FIG. 5 shows a side view of the locking element module according to FIG. 4;

FIG. 6 shows a sectional drawing through the locking element module according to FIG. 4;

DETAILED DESCRIPTION OF THE INVENTION

Figure 1:
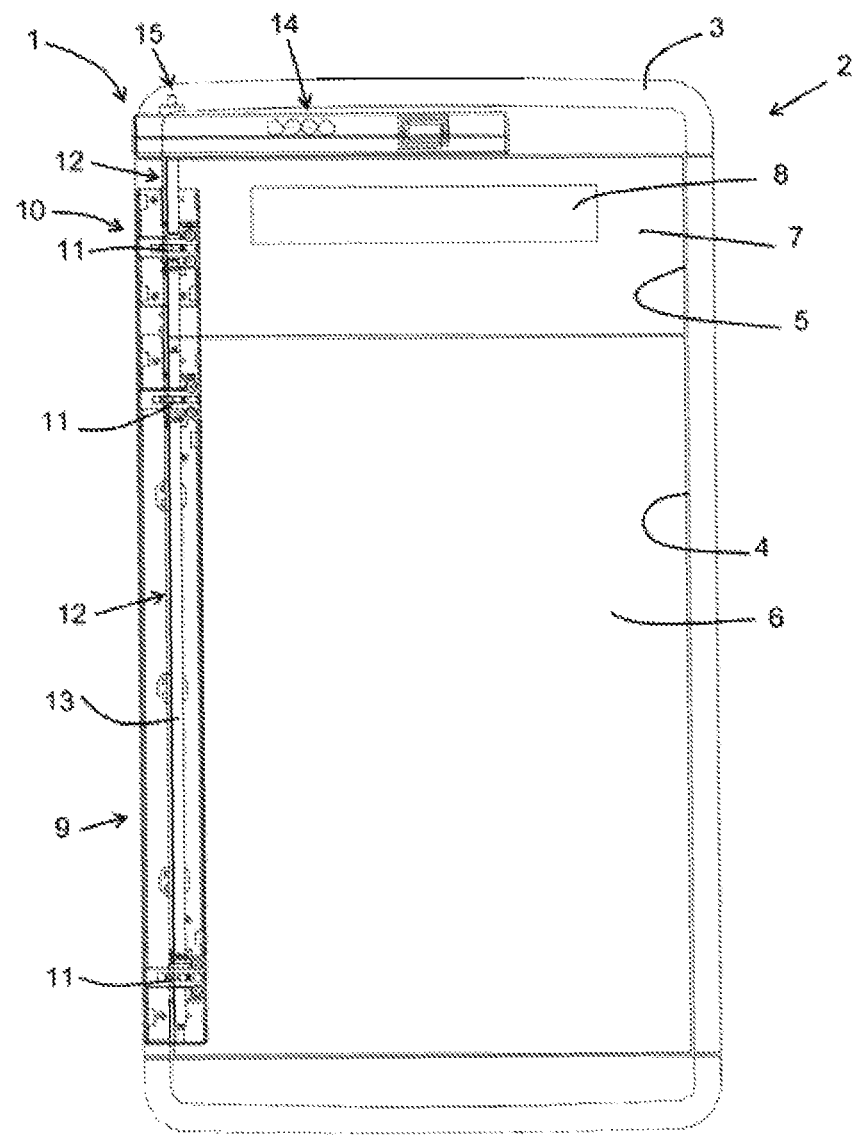
FIG. 1 shows a view of an exemplary embodiment of a parcel mailbox according to the invention with an exemplary embodiment of the locking unit proposed according to the invention, in a partial sectional illustration.

On the basis of the drawing, the locking unit 1 according to the invention will be described below with reference to a particularly preferred use in a parcel mailbox 2 for accommodating letters and parcels to be delivered, having a housing 3 with a first housing opening 4 in a first storage compartment for parcels and having a second housing opening 5 in a second storage compartment for letters.

However, it is to be noted that the parcel mailbox 2 which according to the invention is provided with the proposed locking unit 1 is a particularly preferred embodiment of the present invention. However, the invention is not limited to the use in parcel mailboxes but rather relates generally to housings 3, in particular receptacles for objects, having at least two housing openings 4, 5 which can be locked by means of a first or second door 6, 7, respectively. However, it is also possible to provide more housing openings 4, 5 as well as first and second doors 6, 7, wherein the doors 6, 7 are then associated with a first group of doors 6 and a second group of doors 7. In this context, not all the doors which are present at the parcel mailbox or housing have to be assigned to the locking unit 1 according to the invention; one or more doors can also be locked and unlocked by separate locking units. In order to implement the teaching according to the invention it is sufficient if merely two doors are assigned to the locking unit 1 according to the invention.

In the parcel mailbox 2 described according to the preferred embodiment, the second door 7 has a slot 8 for inserting letters without opening the second door 7 of the second storage compartment. The slot can be provided, for example, with a flap (not illustrated) which opens outward or inward and is not closed. Both doors 6, 7 can be locked by means of the locking unit 1 according to the invention.

The locking unit 1 has, in each case, a locking element module 9, 10 with at least one locking body 11, embodied as a closing hook in the illustrated example, for each door 6, 7, and having a locking drive 12 for actuating the at least one locking body 11 or the plurality of locking bodies 11.

In the illustrated exemplary embodiments, the locking element module 9 for the first door 6 has two locking bodies 11, and the locking element module 10 for the second door 7 has merely one locking body 11. It is, of course, equally satisfactory for the locking element module for the first door 6 also to have more than one locking body 11. The locking drive 12 for each of the two locking element modules 9, 10 has a common drive element 13 which is embodied as a rotatable axle in the form of a rod. The rod 13 as common drive element is embodied so as to be movable (rotatable) by an adjustment distance.

In a first adjustment position, the rod 13 merely moves the locking body 11 for the first door 6 into an unlocking position. In this second adjustment position, which is reached by continuing to rotate the rod 13 as a common drive element, the locking bodies 11 for all the doors 6, 7 are moved into an unlocking position. For the common drive element 13 of the locking drives 12 of the respective locking element modules 9, 10 an electromotive drive 14 is provided which is coupled with an operative connection to the common drive element 13 (rod) by means of a coupling 15 in such a way that the electromotive drive 14 can move the rod 13 (rotatable axle as a common drive element) between the various adjustment positions.

The design of the locking unit according to the invention will be described in more detail below with reference to FIGS. 2 to 9 and using the example of the parcel mailbox 2 with two doors 6, 7. The described and/or illustrated features can also be transferred, as is readily apparent to the person skilled in the art, to other housings 3 with, if appropriate, more than two housing openings 4, 5 by combining or coupling a correspondingly larger number of the individual locking element modules 9, 10 to one another.

The locking element module 9 which is illustrated in FIG. 2 for the first door 6 has, as a locking drive 12, a first rod part 16 which is connected to a second rod part 17 of the locking element module 10 which is illustrated in FIG. 4, in order to form the common drive element 13 of the locking unit 1.

Two locking bodies 11 which are embodied as closing hooks are arranged on the first rod part 16 in that these locking bodies 11 (closing hooks) are secured to the first rod part 16 in a non-movable, i.e. fixed, fashion, such that they cannot rotate with respect to the first rod part 16. The first rod part 16 therefore forms the locking drive 12 of the first locking element module 9 for the first door 6 in that rotating the rod part 16 directly causes the closing hook 11 also to be rotated, specifically from the closing position illustrated in FIG. 2 into a release position in which the closing hook 11 releases a bolt element (not illustrated) of the first door 6, with the result that the door 6 can be opened.

In order to automatically open the first door 6 when the closing hook 11 releases the bolt element of the first door, guide holders 18 for accommodating an ejection ram 19, prestressed by means of a compression spring or the like, are respectively provided above and below the closing hook in an axial direction. As illustrated in FIG. 2, an ejection ram 19 generally suffices to automatically open the door after release of the locking means.

An opening sensor, for example a permanent magnet which interacts with a magnet sensor, may be arranged on the ejection ram 19 in order to detect an open state of the door. This can be used, for example, for a logbook function of a controller in the electromotive drive 14, which controller records the opening and closing of the doors 6, 7 of the housing 3 in a logbook. Such a logbook can be retrieved and checked by the user.

From the sectional drawing according to FIG. 3 it is apparent that the locking bodies 11 which are embodied as closing hooks are connected via a mounting sleeve 20 to the first rod part 16 of the first locking element module 9, with the result that the mounting sleeve 20 and the locking body 11 cannot be rotated with respect to the axle which is formed by the first rod part 16 (as part of the common drive element 13). The forces of rotation of the first rod part 16 are therefore transmitted directly to the closing hook (locking body 11).

It would therefore also basically be possible to connect the closing hook 11 to the first rod part 16 directly, that is to say without providing a mounting sleeve 20. However, the use of the mounting sleeve 20 has the advantage according to the invention that by using the mounting sleeve 20 the same locking body 11 can be used for the first locking element module 9 and the second locking element module 10, which shall be described in detail later with respect to FIGS. 4 to 6.

The first locking element module 9 is embodied as a snap-action closure. This means that the locking bodies 11 are prestressed in the closing direction, that is to say into the closing positions illustrated in FIG. 2. For this purpose, a restoring spring 21 is provided on the first rod part 16, adjacent to the locking body 11, said restoring spring 21 being secured by one end to the first rod part 16 and by the other end to a locking element module body 22 which bears the elements of the first locking element module 9. If the first rod part 16 is rotated out of the closing position (illustrated in FIG. 2) of the locking body 11 into an adjustment position in which the locking body 11 releases a bolt element (not illustrated) of the first door 6, the restoring spring 21 is stressed further, with the result that the rod part 16, if it is no longer held in the release/adjustment position by the electromotive drive 14, rotates back until the locking body 11 is in the closing position illustrated in FIG. 2.

If an opened door 6 is then closed, the closing body 11 is pushed out of the closing position by the bolt element present on the door 6 in that the rod part 16 is rotated counter to the force of the restoring spring 21. As soon as the door 6 is in the closed position, the closing hook which is embodied as a locking body 11 can engage around the bolt element of the door 6, with the result that the rod part 16 is returned to the closing position on the basis of the restoring force of the restoring spring 21, and the bolt element of the door 6 engages in the hook opening of the closing hook 11. This is referred to as a snap-action closure.

The second locking element module 10, illustrated in detail in FIGS. 4 to 6, for the second door 7 has a second rod part 17 which can be coupled to the first rod part 16 via a coupling 23 (also referred to as coupling pieces). For this purpose, elements of the coupling 23 are embodied both on the first rod part 16 and on the second rod part 17 and, when the two rod parts 16, 17 are connected, said elements engage one in the other in a positively locking fashion and transmit the rotational movement of a rod part 16, 17 directly to the other rod part 16, 17. In a way which is analogous to the locking element module 9 for the first door 6, the locking element module 10 for the second door 7 also has a locking body 11 which is embodied as a closing hook and which can be adjusted by rotating the second rod part 17, between a closing position (illustrated in FIG. 4) and an unlocking or release position in which the closing hook 11 releases a bolt element (not illustrated) of the second door 7.

In the unlocked position, the second door 7 is automatically opened by an ejection ram 19, which is provided in a guide holder 18. As also in the case of the first locking element module 9, two guide holders 18 are located in an axial direction on both sides of the locking body 11, wherein an ejection ram 19 has to be provided only in one of the two guide holders 18 in order to reliably open the second door 7 after it has been unlocked.

In contrast to the first locking element module 9, the locking body 11 of the second locking element module 10 is mounted so as to be rotatable with a defined amount of play about the rotatable axle 13 which is formed by the second rod element 17 in the region of the second locking element module 10. This results in a locking body 11 which is rotatably mounted on the second rod part 17 being also moved only if the play in the adjustment distance of the common drive element 13, or of the second rod part 17, is exceeded. Only then does the rotational movement of the locking body 11 begin, said rotational movement disengaging the closing hook (locking body 11) from the bolt element of the second door 7. It is therefore not until then that the second door 7 is opened and therefore the second housing opening into the storage compartment for letters is released.

For the provision of the play, the locking body 11 of the second locking element module 10 is mounted on the second rod part 17 so as to rotate by means of a bearing sleeve. For this purpose, the bearing sleeve 24 has a cutout 25 which is movably guided on the axle 13 which is formed by the rod part 17 and is also rotatable itself. For this purpose, a pin 26 which radially protrudes from the axle 13 engages in the cutout 25 in the bearing sleeve 24. As a result, the play for rotating the bearing sleeve 24 on the axle 25 is defined, because the pin 26 can rotate in the cutout 25 until it reaches the edge of the cutout 25, before the bearing sleeve 24 is also rotated during movement of the rod part 17. The closing hook 11 is fixedly connected to the bearing sleeve 24.

As is apparent from the side view of the locking element module 10 for the second door 7 according to FIG. 5, the bearing sleeve 24 has two cutouts 25 at the opposite axial ends of the bearing sleeve 24, into each of which cutouts 25 a pin 26, which protrudes radially from the rotatable axle 13 formed by the second rod part 17, engages. This means that the bearing sleeve 24 is axially fixed by the two pins 26 which engage in the cutouts 25, and the play for the rotation of the bearing sleeve 24 about the axle 13 is predetermined by the cutout 25 in which the pins 26 are accommodated.

In the closed position which is illustrated in FIGS. 4 and 5 and in which the closing hook 11 is located in the closing position, the pins 26 are accommodated in a central region of the cutout 25 which defines the play for the rotation of the bearing sleeve 24 on the axle. Therefore, two play regions 27, 28 are produced in the cutout 25 for each rotational direction of the axle 13 or of the second rod part 17. The first play region 27 has the effect that the first rod part 17 can firstly be rotated in the direction of an opening movement without the locking body 11 being rotated away from its closing position in which it releases the bolt element of the second door 7. On the other hand, as already explained, during the rotational movement of the rotatable axle 13 as a common drive element, the locking body of the first rod part 16 in the first locking element module 9 is already transferred into a locking position, with the result that the first door 6 already opens. The first play region 27 in the cutout 25 therefore has the effect that the second door 7 does not open until after the first door 6.

Therefore, if the rotatable axle 13 is moved as a common drive element only into a first adjustment position in which the radially protruding pin 26 only utilizes the first play region 27 in the cutout 25 without abutting against the edge of the cutout 27 and also moving the bearing sleeve 24, only the first door 6 is opened and the second door 7 remains closed. By means of a correspondingly controlled rotational movement of the rotatable axle 17, it is therefore possible to selectively release only the first door 6 for opening.

Only if the rotatable axle 13 is rotated further into a second adjustment position does the radially protruding pin 26, bearing against the edge of the cutout 25, entrain the bearing sleeve 24, and therefore the closing hook 11, in order to also unlock the second door 7.

If, on the other hand, the second door 7 is opened and the rotatable axle 13, or the second rod part 17, is located in the closing position shown in FIGS. 4 and 5, the closing body 11 is pushed out of the closing position (illustrated in FIGS. 4 and 5) during the pushing back of the door into its locked position, in that the bolt element of the door abuts against the closing body 11. In this context, the bearing sleeve 24 is rotated on the rotatable axle 13, or the second rod part 17, until the second door 7 is located in its closed position and the closing hook 11 can engage around the bolt element of the second door 7. In this position, the closing hook 11 snaps back into the closed position, driven by the restoring spring 21, in a way analogous to the previously described case of the first locking element module 10.

This is why the second play region 28 of the recess 25 is provided, said play region 28 permitting a movement of the bearing sleeve 27 (and of the closing body 11 which is fixedly connected to the bearing sleeve 27), without the common drive 26 also being rotated.

As is apparent from the sectional drawing according to FIG. 6, the bearing sleeve 24 is mounted in a freely movable fashion on the second rod part 17, apart from the pins 26 which are guided in the cutout 25.

For the coupling 23 of the second rod part 17 to the first rod part 16, the second rod part 17 has an axial bore with a radially extending cutout into which an axial core (illustrated in FIG. 3) engages with a radially extending pin, with the result that the first and second rod parts 17 can be plugged easily one into the other in an axial direction and directly transmit a rotation to one another. The axial core and axial bore are also referred to as coupling pieces which interact in a suitable way in order to bring about the coupling 23.

The coupling pieces of the coupling 23 on the first rod part 16 and the second rod part 17 are embodied symmetrically over the horizontal central axis, with the result that left-hand-right-hand exchangeability of the first locking element module 9 and of the second locking element module 10 is provided. As a result, the module can simply be changed from a right-hand stop of the door to a left-hand stop of the door, or visa versa, by a rotation through 180°.

In order to achieve this exchangeability also with respect to the engagement of the locking body 11 on the bolt elements (not illustrated) of the doors 6, 7, there is also provision that the one or more locking bodies 11 is/are arranged in an axial direction on a rod part 16, 17 in a mirror-symmetrical fashion with respect to the horizontal central axis of the rod part 16, 17. This means that the locking bodies are arranged symmetrically with respect to the center of the rod part 16, 17 on both halves of the rod part 16, 17. Therefore, after a rotation of the locking element module 9, 10 through 180°, the locking bodies 11 are each axially at the same height, with the result that they can correspondingly engage on the bolt elements of the doors 6, 7.

Figure 7:
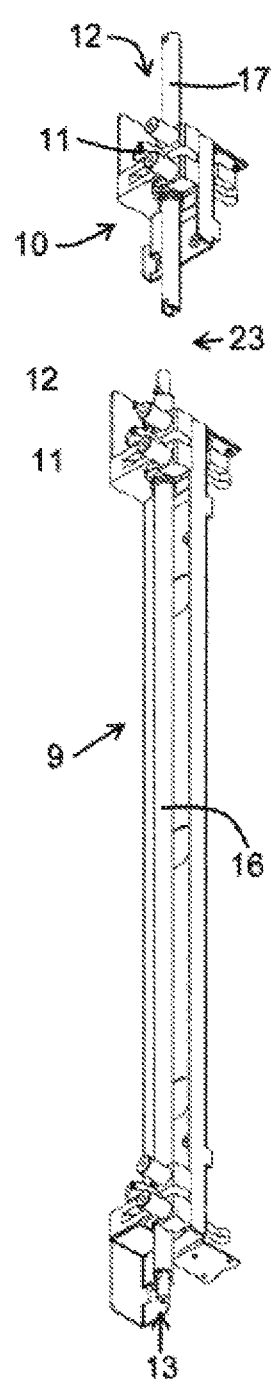
FIG. 7 shows an exploded illustration of the locking element modules according to FIG. 2 and FIG. 4 before being mounted.
Figure 8:
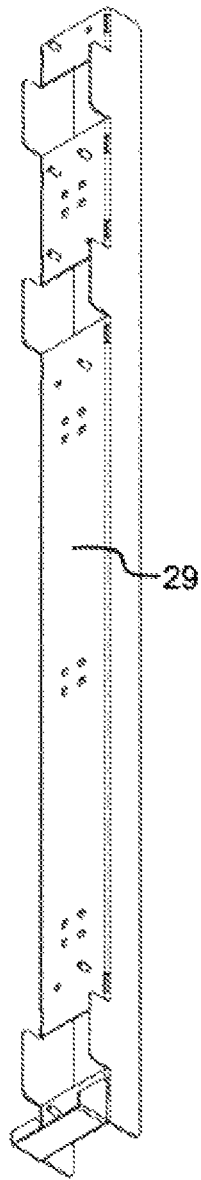
FIG. 8 shows a mounting carrier for mounting the connecting element modules.

FIG. 7 shows an exploded illustration of the locking element module 9 for the first door and the locking element module 10 for the second door 7, which have previously already been explained in detail with respect to FIGS. 2 and 4, respectively. The locking element modules 9, 10 correspondingly have a first rod part 16 and a second rod part 17, respectively, which can be plugged one into the other by means of the coupling 23 described above, with the result that during the rotation of a rod part 16, 17 the other rod part 17, 16 also rotates.

FIG. 7 illustrates the two elements just before the plugging-together operation. After the plugging-together operation, the first rod part 16 and the second rod part 17 together form the common drive element 13 (rotatable axle) which can be connected to the electromotive drive 14 via the coupling 15 (cf. FIG. 1). The electromotive drive 14 can also contain a controller with an authentication function, which controller performs in each case, after authentication has taken place, the adjustment of the rotatable axle 13 as a common drive element, in such a way that either only the first door 6 (in particular of the parcel compartment) or the first door 6 and the second door 7 together (in particular of the parcel compartment and of the letter mailbox together) is/are opened.

In order to make the snap-action closure effective, there can be provision according to the invention that after the opening of the doors 6 and/or 7, proven, for example, by a corresponding door opening sensor in conjunction with the ejection ram 19 for each door 6, 7, the rotatable axle 13 is rotated again by the electromotive drive 14 back into the closing position in which the locking bodies 11 have the positions shown in FIGS. 4 and 6.

After the plugging-together operation of the locking element modules 9, 10, they are mountable on the mounting carrier 29 (shown in FIG. 8) in the form of a mounting plate, wherein for movement of the doors 6, 7 to a right-hand stop or left-hand stop the locking element modules 9, 10 are mountable in any of the two possible positions in which they are rotated through 180°.

Figure 9:
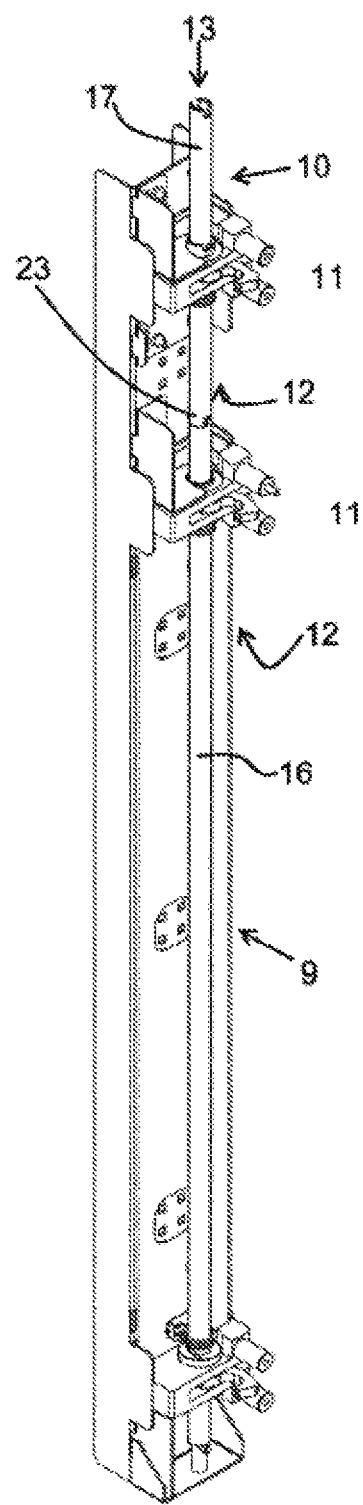
FIG. 9 shows locking element modules according to FIGS. 2 and 4, mounted on the mounting carrier according to FIG. 8, in a three-dimensional view.

FIG. 9 shows the mounting carrier 8 with the locking element modules 9, 10 mounted thereon, the first and second rod parts 16, 17 thereof are joined to the common drive element 13 (rotatable axle).

The proposed locking unit 1 proposes a locking mechanism, which is easy to handle, for a housing 3 with housing openings 4, 5 which can each be closed and locked by doors 6, 7, wherein a first group of doors 6 can be opened separately in that a common drive element 13 of the locking unit 1 is moved into a first adjustment position. When the common drive element 13 is moved into a second adjustment position, both doors 6, 7 are opened together. This application is particularly suitable for a parcel mailbox in which a parcel delivery agent can open and close the first door of the parcel compartment independently of the second door of the letter compartment.

Figure 10:
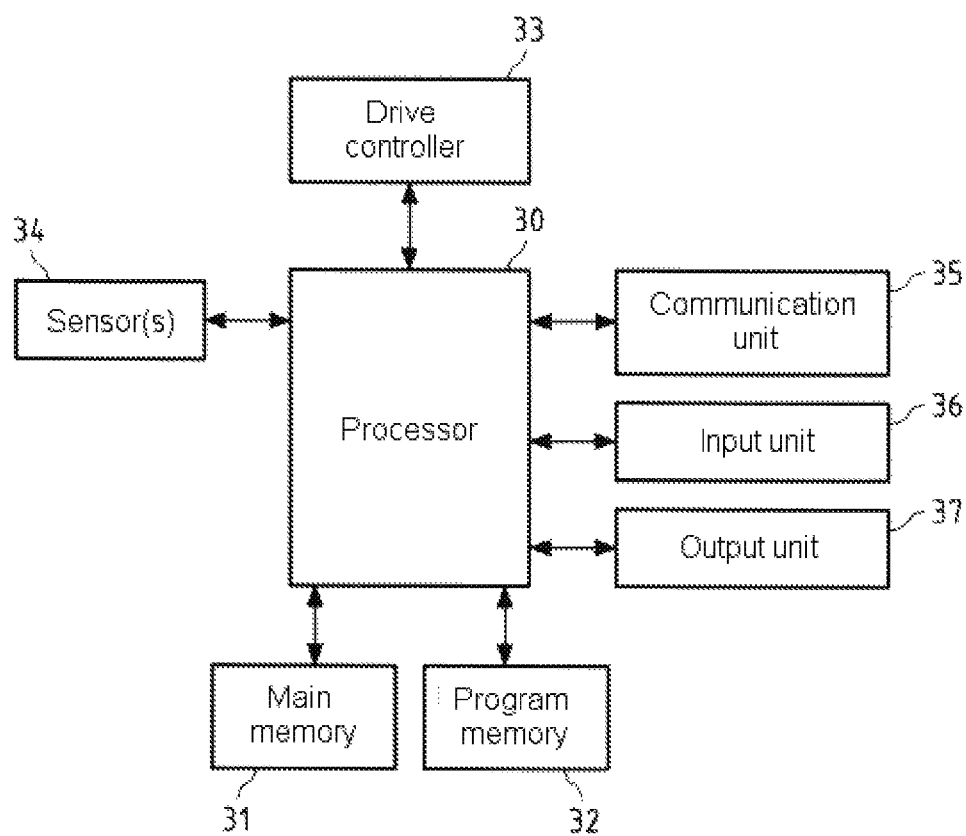
FIG. 10 shows a block circuit diagram of the electronic components of an exemplary embodiment of a parcel mailbox according to the invention.

FIG. 10 is a block circuit diagram of the electronic components 30-37 of an exemplary embodiment of the parcel mailbox 2 according to the invention, as illustrated, for example, in FIG. 1. These components can be arranged, for example, in the interior of the parcel mailbox 2, for example in the vicinity of the drive 14 (see FIG. 1).

A processor 30 with an assigned main memory 31 and program memory 32 is provided. The processor executes, for example, program instructions which are stored in the program memory 32 and, for example, at least partially performs the method according to FIG. 11. The program memory can be, for example, a persistent memory, such as, for example, a read-only memory (ROM). Information which is used to open one or more doors 6, 7 of the parcel mailbox 2 during the checking of the authorization of a person can also be stored in the program memory 32 or in a separate (for example persistent) memory. This information can correspond to the authorization information which a person uses when proving their authorization (for example in the case of codes or symmetrical keys as authorization information), or can correspond to the authorization information (for example in the case of an asymmetrical pair of keys).

In a particularly simple embodiment, for example the first authorization information can be embodied as a first code, and the second authorization information as a second code, wherein the codes are assigned, for example, to different RFID or NFC tags, for example as respective identifier of the RFID or NFC tags. The first and second codes are then stored, for example, on the one hand, in the memory 32 and, on the other hand, the first code is stored on a first RFID or NFC tag, and the second code is stored on a second RFID or NFC tag. This can be done, for example, by teaching these codes to the memory 32 after the delivery of the parcel mailbox 2. Alternatively, one or both codes can already be stored in the memory 32 when the parcel mailbox 2 is manufactured or when the parcel mailbox 2 is equipped with the electronic components in FIG. 10. It is also conceivable that the components in FIG. 10 are embodied at least in a partially modular fashion and are already provided with one or more of the codes (for example at least with the second code which is assigned to the owner) at the time of delivery to the manufacturer or installer of the parcel mailbox 2. In analogous fashion, the codes can also already be stored in the RFID or NFC tags during their manufacture or may only be taught thereto later. The second RFID or NFC tag is then made available to the owner of the parcel mailbox 2, while the first RFID or NFC tag is made available to a delivery agent or to a group of delivery agents.

Alternatively, instead of the identifiers of the tags, it is possible to tailor the process, for example, to the identifier of the parcel mailbox 2. The tags which are to provide authorization for opening a parcel mailbox 2 then have, for example, authorization information stored in them which is based on encryption of the identifier of the parcel mailbox 2 which is to be opened. The first and second authorization information can then differ, for example, in that, in addition to the identifier of the parcel mailbox 2, further information, (for example a correspondingly set flag with the meaning "0"=first authorization information and "1"=second authorization information) is added and is encrypted together with or separately from the identifier of the parcel mailbox 2, in order to obtain the first/second authorization information. The parcel mailbox 2 (in particular the processor 30 thereof) can then decrypt this first/second authorization information, check, on the basis of the comparison of the decrypted parcel mailbox identifier with a version of the parcel mailbox identifier which is stored in the parcel mailbox 2 (for example in the memory 32), whether the authorization relates basically to the correct parcel mailbox, and on the basis of the additional decrypted information (for example of the flag) said parcel mailbox 2 can determine whether first or second authorization information is present. The encryption can use here, for example, a separate key per tag, which key depends, for example, on an identifier of the tag. Alternatively, the encryption can also use the same key for all the tags. In the parcel mailbox, either the one key which is used for all the tags (or a key which corresponds thereto) is then stored, or the respective tag-specific keys (or the keys corresponding thereto) are stored or can be generated (for example by means of a predefined algorithm which takes into account the identifier of the respective tag).

As a further alternative, authorization information can be used which contains one or more authorization characteristic variables and the result of a cryptographic operation using the authorization characteristic variables. One of the authorization characteristic variables can be, for example, an identifier of the parcel mailbox 2, and another authorization characteristic variable can be a flag or some other information which indicates which door or doors of the parcel mailbox 2 are allowed to be opened when this authorization information is submitted (for example with the meaning "0"=first authorization information and "1"=second authorization information, or for example "0"=open the parcel compartment, and "1"=open the parcel compartment and letter compartment). The cryptographic operation can as a result generate, for example, a MAC, for example a CMAC or HMAC which is based on a key which is stored in the parcel mailbox 2. The parcel mailbox 2 (in particular the processor 30 thereof) forms itself, after reception of the authorization information with the authorization characteristic variables contained therein and the MAC relating thereto, the MAC from the received authorization characteristic variables (using the key stored in the parcel mailbox 2) and checks this against the received MAC. In the case of correspondence, integrity of the authorization characteristic variables is assumed and it is checked whether the housing identifier of the authorization information matches the housing identifier of the parcel mailbox 2. If this is the case, it is decided on the basis of the flag which door or doors of the parcel mailbox is or are to be opened. As has already been explained above, further authorization characteristic variables may be contained in the authorization information whose integrity can also be ensured via the MAC and which are then counter-checked in the parcel mailbox 2, for example a validity time period of the authorization information. It has also been explained above that the authorization information can be equally valid for a plurality of parcel mailboxes in that, for example, a group identifier and the same key can be used for this plurality of parcel mailboxes. Alternatively, individual pieces of authorization information can be used for each parcel mailbox, but these pieces of information are, for example, nevertheless stored in groups on a hand-held scanner and then correspondingly selected at each parcel mailbox, for example automatically or at least with the assistance of the hand-held scanner by reducing the pieces of authorization information available for selection. Instead of MAC, the cryptographic operation can also generate a digital signature (for example an encrypted hash value) using the authorization characteristic variables, for example with a first key of an asymmetric pair of keys. The digital signature can then be counter-checked in the parcel mailbox 2 by means of a second key, stored there, of the asymmetric pair of keys (for example by decrypting the encrypted hash value and comparing it with a locally generated hash value using the received authorization characteristic variables) in order to determine the integrity of the pieces of authorization information.

The main memory 31 is used to store temporary results during the processing of the program instructions, this involves, for example, a volatile memory, such as, for example, a random-access memory (RAM).

The processor controls a drive controller 33, which serves to control the drive 14 (see FIG. 1). For example, control signals of the processor are converted, in the drive controller 33, into voltage signals for the drive 14, in order to move the common drive element 13, coupled to the drive 14, into a first or second adjustment position or into the closing position. The movement position which is assumed by the common drive element 13 can be checked, for example with one or more of the sensors 34 (for example a magnetic field sensor as has already been explained above), and, for example, included in the control process.

Further sensors of the sensors 34 serve, for example, to detect whether respective doors of the doors 6, 7 are opened or closed. As explained above, this may involve, for example, opening sensors which are each mounted, for example, on the ejection ram 19.

The processor 30 is also operatively connected to a communication unit 35, with which, for example, a wireless exchange of information (for example via radio or optically) with external devices is possible, for example in order to receive, from the external devices, authorization information or information which was generated using authorization information, and therefore to make said information available to the processor 30 for checking. The communication unit 35 can be embodied, for example, as an RFID and/or NFC reading unit and be capable of receiving authorization information or information which was generated using authorization information, by means of RFID and/or NFC transmission technology from an, in particular portable, data carrier (for example an RFID and/or NFC tag) or a portable electronic appliance which supports RFID and/or NFC transmission technology and is embodied, for example, as a hand-held scanner or cell phone. Instead of, or in addition to, RFID and/or NFC transmission technology, WLAN (Wireless Local Area Network) transmission technology, Bluetooth transmission technology or transmission technology according to a cellular mobile communication system, such as, for example, according to the GSM (Global System for Mobile Communications) standard, UMTS (Universal Mobile Telecommunications) standard or LTE (Long Term Evolution) standard can also be used. Additionally or alternatively, the use of optical transmission technology is conceivable, for example via infrared communication.

Additionally or alternatively to the communication unit 35, an input unit 36 is provided which is operatively coupled to the processor 30 and can be used by persons in order to input authorization information, or information generated using authorization information, into the input unit 36, and therefore make it available to the processor for checking the authorization. The input unit 36 can comprise, for example, a keypad, a touchpad, acoustic capturing means and/or optical capturing means, in particular a scanner.

Finally, an output unit 37 is optionally provided, by means of which, for example, operating states of the parcel mailbox 2, such as, for example, a state of charge of a battery or a filling level of one or more compartments 4, 5 of the parcel mailbox 2, or a logbook relating to the unlocking operations which have taken place, and optionally the pieces of authorization information used in the process, can be output. The output unit can comprise an electronic read-out interface and/or an optical and/or acoustic signaling device. For example, a state of charge of a battery and/or a filling state can be displayed visually by means of light sources.

The components 30-37 can be embodied, for example, together as a module or can be embodied at least partially as individual modules, in order to ensure easy exchangeability in the case of any defects.

Figure 11:
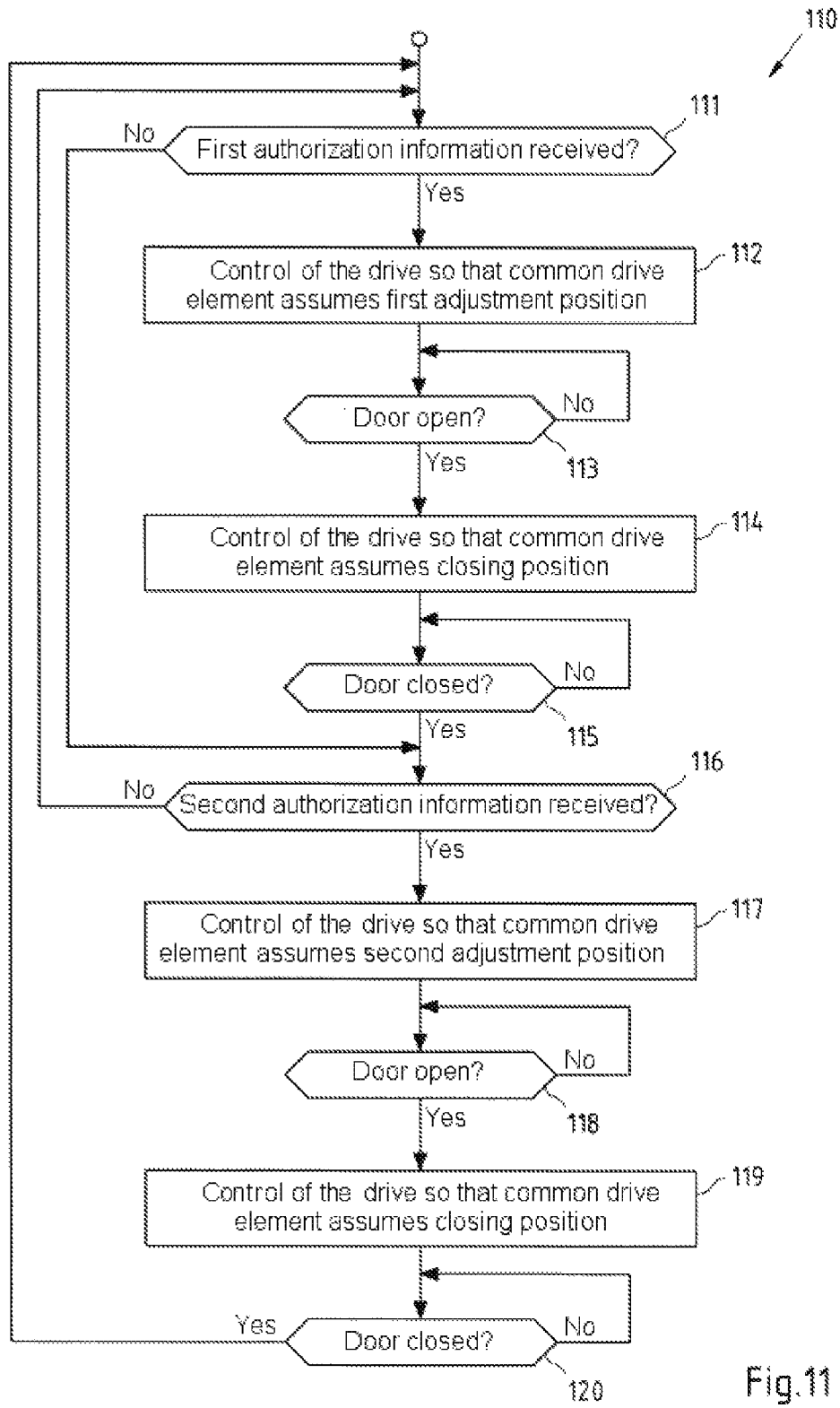
FIG. 11 shows a flowchart of an exemplary method for controlling the unlocking of one or more doors of a parcel mailbox according to the invention.

FIG. 11 is a flowchart 110 of an exemplary method for controlling the unlocking of one or more doors 6, 7 of a parcel mailbox 2 according to the invention, as illustrated, for example, in FIG. 1. This method can be performed, for example, by the processor 30 and the drive controller 33 (see FIG. 10).

A starting point of the method 110 is a state in which all the doors 6, 7 of the parcel mailbox 2 are closed and locked.

In a first step 111, it is checked whether first authorization information was received. This can take place by receiving information via the communication unit 35 or inputting information into the input unit 36. In the processor 30 it is then checked whether the received information constitutes the first authorization information, for example by comparison with first authorization information which is stored in the program memory 32, or by processing (for example decrypting) the first authorization information and comparing the obtained result with information stored in the program memory 32, or by evaluating the received result of a piece of cryptographic information using the authorization characteristic variables (for example an MAC or a digital signature) for checking the integrity of the authorization characteristic variables and—in the case of correspondence—evaluating the authorization characteristic variables, which are therefore considered to exhibit integrity, by comparison with stored, generated or received pieces of information, as has already been described above.

If the processor 30 decides that first authorization information was received (which means that the person who is proving their identity with the first authorization information, is authorized to open the door 6), in step 112 the drive 14 is controlled by means of the drive controller 33 in such a way that the common drive element 13 assumes the first adjustment position, that is to say the door 6 is unlocked. Otherwise, the method jumps to step 116.

After the control of the drive 14, in step 113 it is then checked, by means of an opening sensor as described above, whether the door 6 was opened. The opening can have taken place by means of the ejection ram 19 or by manual opening of the door 6 by a person. If it is detected that the door is open, in step 114 the drive 14 is controlled by means of the drive controller 33 in such a way that the common drive element 13 assumes the closing position. Otherwise, the method 110 remains in the checking loop 113 as to whether the door 6 is opened, until the door 6 is actually opened.

After the control of the common drive elements to assume the closing position, in step 115 it is then checked again in a checking loop whether the door 6 was closed. If this is the case, the method 110 continues to step 116, and otherwise it stays in the loop 115 until the door is closed. As has already been explained above, when closing occurs the door 6 is then also automatically locked owing to the snap-action closure.

In step 116 it is checked whether second authorization information was received. This occurs in an analogous fashion to the checking for the reception of the first authorization information in step 111. If it is detected that second authorization information was received (which means that the person who proves their identity with the second authorization information is authorized to open the doors 6 and 7), the drive 14 is controlled by means of the drive controller 33 in such a way that the common drive element 13 assumes the second adjustment position, that is to say both doors 6, 7 are unlocked. Otherwise, the method jumps back to step 111.

In step 118 it is in turn checked whether both doors 6, 7 are opened, for example on the basis of opening sensors.

If both doors 6, 7 are closed, in step 119 the drive 14 is controlled by means of the drive controller 33 in such a way that the common drive element 13 assumes the closing position.

In step 120, it is then checked for both doors 6, 7 whether they are closed, and only in the case of closed doors 6, 7 does the method 110 jump back to step 111.

In the method 110, it is irrelevant whether it is firstly checked (step 111) whether first authorization information was received and then checked (step 116) whether second authorization information was received, this sequence can equally well also be interchanged (in each case with the subsequent steps). Instead of checking as to whether first/second authorization information was received, it can equally well be checked whether information which was generated using first/second authorization information was received. The steps 113 and/or 118 are optional. For example, in each case it can reliably be assumed that an opening is reliably performed via the respective ejection ram 19 or that a user manually opens the doors 6 and/or 7 directly after the unlocking, and then instead of the execution of the steps 113 and/or 118 after a predefined delay, for example after 3, 5, 10 or 20 s, to give just a couple of examples, the control of the drive 14 is performed automatically again, in order to move the common drive element 13 into the closing position (steps 114 and 119). The steps 115 and/or 120 can in addition basically be eliminated if it is assumed that the users of the parcel mailbox 2 always reliably and promptly close the doors 6, 7 after the ending of the process of placing one or more shipments in the parcel mailbox or removing one or more shipments therefrom. Alternatively, in steps 115 and/or 120 in each case a further step can be provided which outputs a signal (for example a warning tone or a digitalized spoken or synthetically generated instruction) to the user if the door 6 (step 115) or the doors 6 and 7 (step 120) have not been closed after a predefined time after the unlocking or after the assumption of the closing position, for example 10, 20 or 30 s, to give just a couple of examples.

In the method 110, it can also optionally be provided that the door 6 of the parcel mailbox cannot be unlocked twice in direct succession using the first authorization information. This serves for example, to avoid the situation in which a delivery agent (who uses the first authorization information) attempts to place more than one shipment in the parcel compartment 4 of the parcel mailbox 2 (for example over several days), without the parcel mailbox having been emptied by the owner in the meantime (which owner uses the second authorization information), and/or to avoid a situation in which a second delivery agent who uses the first authorization information can unlock the parcel compartment 4, into which a first delivery agent, who also uses the first authorization information, has already placed an shipment, before the parcel compartment was emptied by the owner of the parcel mailbox 2 (who uses the second authorization information). This can be achieved, for example, by keeping a logbook in which information is stored, at least for a limited time period or limited number of unlocking operations, which indicate which authorization information was used to unlock the door 6, and an interrogation in step 111 as to whether, when the first authorization information is received, it relates to the second directly successive unlocking using the first authorization information. If a plurality of delivery agents use respective different first authorization information in order to unlock the door 6, it can correspondingly also be checked whether directly successive unlocking operations take place for different first authorization information, and this can be prevented. After each unlocking operation with first authorization information it would then firstly be necessary for unlocking with second authorization information to take place.

However, in contrast to this, for example a plurality of directly successive unlocking operations can be possible using the second authorization information (for example so that the owner of the parcel box can take a delivered parcel from the parcel compartment in the morning and in the afternoon can place a parcel to be collected in the parcel compartment).

Figure 12:
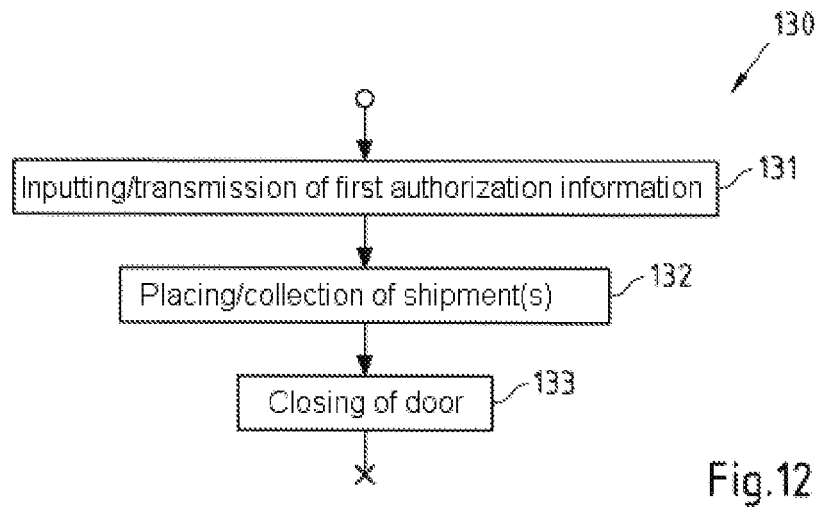
FIG. 12 shows a flowchart of an exemplary embodiment of the method according to the invention for locking one or more doors of the parcel mailbox according to the invention, performed by a delivery agent.

FIG. 12 illustrates a flowchart 130 of an exemplary embodiment of the method according to the invention for unlocking one or more doors 6 of the parcel mailbox 2 according to the invention, as illustrated in FIG. 1. In this context, for example a delivery agent uses first authorization information in order to prove, with respect to the parcel mailbox 2, his authorization to unlock the door 6.

In a first step 131, the first authorization information is input by the delivery agent into the inputting means 36 (see FIG. 10) of the parcel mailbox 2 (for example by means of a keypad or other means as already described above) or is transmitted to the communication unit 35 of the parcel mailbox 2, for example using a device on which the first authorization information is stored, by the delivery agent. The delivery agent can therefore hold, for example, an RFID or NFC tag (or else an electronic appliance such as a hand-held scanner) with first authorization information stored on it in front of a communication unit 35 which is embodied as an RFID or NFC reading device, which causes the first authorization information, or information which was generated using the first authorization information, to be transmitted to the communication unit 35.

The first authorization information which is received at the parcel mailbox 2, or the information which is generated therewith, is then checked by the processor 30 (see FIG. 10) and causes the door 6 of the parcel compartment 4 to be unlocked (see FIG. 1).

In step 132, the delivery agent then places one or more shipments in the parcel compartment 4 and closes the door in step 133. The closing of the door 6 then automatically causes the door 6 to be locked owing to the embodiment of the locking element module 9 as a snap-action closure.

Figure 13:
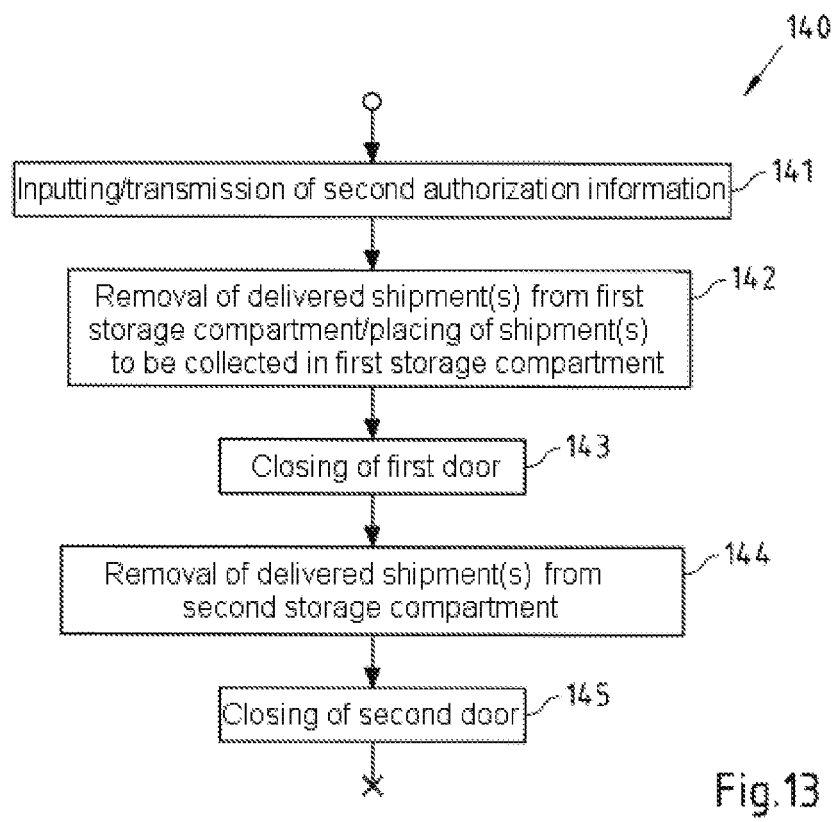
FIG. 13 shows a flowchart of a further exemplary embodiment of the method according to the invention for unlocking one or more doors of the parcel mailbox according to the invention, performed by an owner of the parcel mailbox.

FIG. 13 is a flowchart 140 of a further exemplary embodiment of the method according to the invention for unlocking one or more doors 6, 7 of the parcel mailbox 2 according to the invention, performed by an owner of the parcel mailbox 2. The owner uses for this purpose the second authorization information which authorizes him to unlock both doors 6, 7.

In a first step 141, the second authorization information is input by the owner into the input means 36 (see FIG. 10) of the parcel mailbox 2 (for example by means of a keypad or other means as already described above) or is transmitted to the communication unit 35 of the parcel mailbox 2, for example using a device on which the first authorization information is stored, by the owner. The owner can therefore hold, for example, an RFID or NFC tag (or else an electronic appliance such as a cell phone) with second authorization information stored on it in front of a communication unit 35 which is embodied as an RFID or NFC reading device, which causes the second authorization information, or information which was generated using the second authorization information, to be transmitted to the communication unit 35.

The second authorization information received at the parcel mailbox 2, or the information generated therewith is then checked by the processor 30 (see FIG. 10) and causes the door 6 of the parcel compartment 4 and the door 7 of the letter compartment 5 to be unlocked (see FIG. 1).

In step 142, the owner then removes one or more delivered shipments from the parcel compartment 4 or places one or more shipments to be collected in the parcel compartment 4, and closes the door 6 in step 143. The closing of the door 6 then automatically causes the door 6 to be locked owing to the embodiment of the locking element module 9 as a snap-action closure.

Since the door 7 of the letter compartment 5 has also been unlocked, the owner can additionally, and in contrast to the delivery agent (cf. the method 130 in FIG. 12), also remove one or more delivered shipments, for example letters, from the letter compartment 5, and then in step 145 can close the door 7, which in turn causes the door 7 to be locked, since the locking element module 10 thereof is also embodied as a snap-action closure.

The methods 130 and 140 in FIGS. 12 and 13 can, of course, be performed at the same parcel mailbox 2, as is also clarified by the method 110 in FIG. 11.

The housing according to the invention was described in this specification as a housing which comprises a locking unit according to the invention which is characterized, inter alia, by a common drive element. In the same way, the method according to the invention was described as a method which serves to unlock a housing according to the invention with such a locking unit according to the invention. Instead of the locking unit according to the invention, it is, however, also possible to use, for example, separate locking units which are assigned to the respective doors of the housing and which do not have a common drive element, and can, for example, be controlled separately, in order to unlock the respective door (the locking can, for example, take place in turn by means of a snap-action closure), which is, however, structurally more complex and can require, in particular, a plurality of drives, for example one per locking unit.

Nevertheless, a housing which is modified in such a way and a method for unlocking one or more doors of this modified housing are also to be considered as being disclosed here, in which housing, instead of the control of the drive in such a way that a first adjustment position of the common drive element is assumed, respective locking units are controlled to unlock the door or first group of doors, which are respectively assigned to said locking units, of at least two doors of the housing, and instead of the control of the drive in such a way that a second adjustment position of the common drive element is assumed, respective locking units are controlled to unlock all of the doors, which are respectively assigned to said locking units, of the at least two doors of the housing. Accordingly, for example, instead of the control of the drive in such a way that the closing position is assumed by the common drive element, the respective locking unit is then controlled to assume the closing position. Such a locking unit can be embodied, for example, as a locking element module (9 or 10 in FIG. 1) and can be connected, for example, to a respective drive, but not to the drives of other locking units. However, it is immediately clear to a person skilled in the art that the locking unit can also be embodied in other ways, for example in the form of a bolt which can be shifted electromotively or magnetically, for example with spring loading in order to implement a latch function, in order to give just one example.

In FIG. 10, for example merely the drive controller 33 would then have to be replaced by a drive controller which can respectively separately control the drives of the respective locking units (for example of a first locking unit assigned to the door 6 and a second locking unit assigned to the door 7), and if authorization is proven on the basis of first authorization information, said drive controller 33 controls only the first locking units, assigned to the parcel door 6, to unlock, but if authorization is proven on the basis of second authorization information said controller 33 controls the first and second locking unit, assigned to the parcel door 6 and to the letter door 7, to unlock. The processor 30 and the further components, in particular the communication unit 35, the input unit 36 and the output unit 37 would then be used, for example, together and, for example, only the locking units would be provided multiply.

Correspondingly, the step 112 in FIG. 11 is to be modified in such a way that merely the first locking unit is controlled to unlock the door 6, the step 114 would have to be modified in such a way that merely the first locking unit is moved into the closing position (in which the snap-action closure can be triggered), the step 117 would have to be modified in such a way that merely the first and second locking units are controlled to unlock the doors 6 and 7, and the step 119 would have to be modified in such a way that the first and second locking units are moved into the closing position (in which the snap-action closure can be triggered).

It would readily be possible for persons to operate such a modified housing by means of the method described in FIGS. 12 and 13. The statements in this specification relating to the first and second authorization information, in particular the way in which said information can be transmitted to the housing or can be input therein, how validity limitations can be imposed, how first authorization information can be valid a plurality of housings, how first authorization information can be valid only for one housing, but can be stored with further first authorization information for unlocking further housings on the same portable electronic device, and/or how the unlocking of doors (in particular of the parcel door 6) can be prevented in the case of repeated directly successive use of the first authorization information, are then also readily valid for this modified housing and are to be understood as being disclosed in this way.

The aspect of the validity limitation (for example temporally or according to the number of unlocking operations) with respect to the first authorization information is also to be understood as being disclosed independently of the housing according to the invention and the modified housing, this is to say quite generally in a context in which the first authorization information can be used to unlock one or more doors of one or more housings (for example parcel boxes or parcel letter mailboxes), for example even without one or more further doors, which may be present, of the housing or housings being able to be unlocked with second authorization information, but, for example, likewise also in a scenario in which the unlocking of one or more further doors is possible by means of second authorization information. Therefore, it is to be understood, for example, as being disclosed that only the respective parcel door or doors (or parcel compartment door or doors) of one or more parcel boxes or parcel letter mailboxes can be unlocked with first authorization information of limited validity.

A letter door (or letter compartment door) which is then possibly provided in a parcel letter mailbox can then be unlocked, for example, in other ways, for example mechanically with a key.

Furthermore, the following exemplary embodiments of the invention are disclosed:

Embodiment 1

Locking unit for a housing (3), in particular for a receptacle for objects, having at least two doors (6, 7) for locking respective housing openings (4, 5), in particular leading to storage compartments, wherein the locking unit (1) has, for each of the doors (6, 7), in each case a locking element module (9, 10) with at least one locking body (11) and a locking drive (12) for actuating the locking body (11), characterized in that the locking drive (12) for the locking element modules (9, 10) has a common drive element (13) which can be moved by an adjustment distance, and in a first adjustment position moves the locking body or bodies (11) for merely one of the doors (6) or merely a first group of doors (6) of the doors into an unlocking position, and in a second adjustment position moves the locking bodies (11) for all of the doors (6, 7) into an unlocking position.

Embodiment 2

Locking unit according to embodiment 1, characterized in that the common drive element (13) is embodied as a rotatable axle which has first and second rod parts (16, 17) which can be releasably secured to one another in such a way that first and second rods parts (16, 17) rotate together, and in that each locking body (11) is non-movably secured to the/each first rod part (16), and in that each locking body (11) is mounted on the/each second rod part (17) so as to be rotatable about the axle (13) with a defined amount of play.

Embodiment 3

Locking unit according to embodiment 2, characterized in that the locking body (11) which is rotatably mounted on a second rod part (17) has a bearing sleeve (24) with a cutout (25), which bearing sleeve is movably guided on the axle (13), wherein a pin (26) which protrudes radially from the axle (13) engages in the cutout (25) in the bearing sleeve (24) and as a result defines the play with respect to the rotation of the bearing sleeve (24) on the axle (13).

Embodiment 4

Locking unit according to embodiment 3, characterized in that the pin (26) on the axle (13) is accommodated in the locking position of the locking body (11) in a central region of the cutout (25) which defines the play for the rotation of the bearing sleeve (24) on the axle (13).

Embodiment 5

Locking unit as claimed in one of embodiments 2 to 4, characterized in that one or more locking bodies (11) are arranged in an axial direction on a rod part (16, 17) in a mirror-symmetrical fashion with respect to the horizontal central axis of the rod part (16, 17).

Embodiment 6

Locking unit as claimed in one of embodiments 2 to 5, characterized in that the first and second rod parts (16, 17) have, at both ends, coupling pieces (23) which are constructed symmetrically about the horizontal central axis of each rod part (16, 17).

Embodiment 7

Locking unit according to one of the preceding claims, characterized in that at least one of the locking element modules (9, 10) is embodied as a snap-action closure.

Embodiment 8

Locking unit as claimed in one of the preceding claims, characterized in that at least one locking element module (9, 10) of the locking element modules (9, 10) has an ejection ram (19), prestressed in the opening direction, for automatically opening the door when unlocking occurs.

Embodiment 9

Locking unit according to one of the preceding claims, characterized in that the common drive element (13) is connected to a drive via a coupling (15).

Embodiment 10

Locking unit according to one of the preceding claims, characterized in that, after the movement to open the doors (6, 7), the common drive element (13) is moved back into the home position corresponding to the locking position of the locking bodies (11).

Embodiment 11

Locking unit according to one of the preceding claims, characterized in that a mounting carrier (29), on which the locking element modules (9, 10) are mountable rotated through 180° in each case with respect to the axial direction of the common drive element (13), is provided.

Embodiment 12

Housing (3), in particular a receptacle for objects, having at least two doors (6, 7) for locking respective housing openings (4, 5), in particular leading to storage compartments, comprising a locking unit (1) according to one of the preceding claims.

Embodiment 13

Housing (3) according to embodiment 12, also comprising:

authorization checking means for checking the respective authorization of persons to unlock one or more of the doors of the housing, on the basis of authorization information which is respectively used by the persons when providing proof of authorization, and control means for controlling a drive assigned to the common drive element (13) depending on the result of the check of the authorization checking means, with the result that the common drive element assumes the first adjustment position if first authorization information was used when providing proof of authorization, and assumes the second adjustment position if second authorization information was used when providing proof of authorization.

Embodiment 14

Housing (3) according to embodiment 13, wherein the first authorization information can be used by a delivery agent or a group of delivery agents and authorizes said agent/agents to unlock merely one of the doors (6) or merely the first group of doors (6) of the doors (6, 7) in order to permit said agent/agents to place one or more shipments in the respective housing opening or openings (4) and/or to collect one or more shipments, in particular parcels, from the respective housing opening or openings (4), and wherein the second authorization information authorizes at least one person assigned to the housing (3), in particular an owner of the housing (3), to unlock all of the doors (6, 7), in order to permit said person to remove one or more delivered shipments, in particular parcels, from the housing opening or openings (4) which is/are assigned to the door (6) or to the first group of doors (6), or to place one or more shipments which are to be collected, in particular parcels, in the housing opening (4) which is/are assigned to the door (6) or to the first group of doors (6), and to remove one or more delivered shipments, in particular letters, from the housing opening or openings (5) which is/are assigned to the remaining door or doors (7) of the doors (6, 7).

Embodiment 15

Housing (3) according to one of embodiments 13-14, wherein the authorization checking means are configured to prevent the door (6) or the first group of doors (6) of the doors of the housing (3) from being unlocked from twice in direct succession with respective use of the first authorization information.

Embodiment 16

Method for unlocking one or more doors (6, 7) of a housing (3), according to one of embodiments 13-15, the method comprising:

proving, vis-à-vis to the authorization checking means of the housing, the authorization of a person to unlock one or more doors (6, 7) of the housing (3) by using the first or second authorization information.

Embodiment 17

Method according to embodiment 16, wherein proving the authorization comprises the following:

inputting the first or second authorization information, or information which was generated using the first or second authorization information, into an input unit of the housing (3), or transmitting, in particular in a wireless fashion, the first or second authorization information, or information which was generated using the first or second authorization information, to a reception unit of the housing (3).

Embodiment 18

Method according to one of embodiments 16-17, wherein the first authorization information provides authorization for unlocking, in each case, one or more doors (6) of a plurality of housings (3).

Embodiment 19

Method according to embodiment 18, wherein the first authorization information is stored on a portable electronic device, in particular on an RFID or NFC tag or on a hand-held scanner.

Embodiment 20

Method according to one of embodiments 16-17, wherein the first authorization information provides authorization for unlocking, in each case, one or more doors (6) of only one housing (3), and wherein the first authorization information is stored, together with further first authorization information which provides authorization for unlocking, in each case, one or more doors (6) of one or more further housings (3), on a portable electronic device, in particular on an RFID or NFC tag or on a hand-held scanner.

Embodiment 21

Method according to one of embodiments 16-20, wherein the first authorization information has a temporally limited validity and/or becomes invalid after a predefined number of uses for proving the authorization.

Embodiment 22

Method according to one of embodiments 16-21, wherein the first authorization information is used to prove the authorization.

Embodiment 23

Method according to embodiment 22, wherein the method is a method for unlocking one or more doors (6, 7) of the housing (3) and for using the housing (3), the method also comprising:

placing one or more shipments in the housing opening or openings (4) which is/are respectively assigned to the one unlocked door (6) or to the first group of unlocked doors, and/or collecting one or more shipments, in particular parcels, from the housing opening or openings which is/are respectively assigned to the one unlocked door (6) or to the first group of unlocked doors, and closing the unlocked door (6) or the first group of unlocked doors.

Embodiment 24

Method according to one of embodiments 16-21, wherein the second authorization information is used to prove the authorization.

Embodiment 25

Method according to embodiment 24, wherein the method is a method for unlocking one or more doors (6, 7) of the housing (3) and for using the housing (3), the method also comprising:

removing one or more delivered shipments, in particular parcels, from the housing opening or openings (4) which is/are assigned to the unlocked door (6) or the first group of unlocked doors (6), or placing one or more shipments which are to be collected, in particular parcels, in the housing opening (4) which is/are assigned to the unlocked door (6) or the first group of unlocked doors (6), removing one or more delivered shipments, in particular letters, from the housing opening or openings (5) which is/are assigned to the remaining unlocked door or doors (7), and closing the unlocked doors.

The following is a list of reference numerals provided for convenient reference to the figures. The numerals listed herein are not intended to be a definitive or exhaustive listing of the reference numerals and should not be read as limiting any other broader recitation attributed to like reference numerals mentioned in the preceding discussion.

1 Locking unit
2 Parcel mailbox
3 Housing
4 First housing opening
5 Second housing opening
6 First door
7 Second door
8 Slot for inserting letters
9 Locking element module for the first door
10 Locking element module for the second door
11 Locking body, closing hook
12 Locking drive
13 Common drive element, rotatable axle in the form of a rod
14 Electromotive drive
15 Coupling between drive and common drive element
16 First rod part
17 Second rod part
18 Guide holders
19 Ejection ram
20 Mounting sleeve
21 Restoring spring
22 Locking element module body
23 Coupling, coupling pieces
24 Bearing sleeve
25 Cutout
26 Radially protruding pin
27 First play region
28 Second play region
29 Mounting carrier
30 Processor
31 Main memory
32 Program memory
33 Drive controller
34 Sensor/sensors
35 Communications unit
36 Input unit
37 Output unit
110, 130, 140 Flowcharts
111-120, 131-133, 141-145 Flowchart steps The sequence of the method steps in the individual flowcharts as described in this specification is not compulsory, and alternative sequences of the method steps are conceivable. The method steps can be implemented in various ways, for example an implementation using software (by means of program instructions), hardware or a combination of the two is conceivable for the implementation of the method steps.

The exemplary embodiments of the present invention as described in this specification are also to be disclosed in all combinations with one another. In particular, the description of a feature which is included in an embodiment is also not to be understood here as meaning that the feature is indispensable or essential for the function of the exemplary embodiment, unless the converse is explicitly stated. The formulation "and/or" is to be understood in this specification as meaning that in the case of "A and/or B" the configurations "A", "B" and "A and B" are included. Formulations such as "comprise" or "with" or "having" are to be understood as in an open fashion, that is to say that the presence of further features is therefore possible but not compulsory.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A housing, having at least two doors for locking respective housing openings, comprising one of:
   a locking unit which respectively has for each of the doors
      a locking element module with at least one locking body and a locking drive for actuating the locking body, wherein the locking drive for the locking element modules has a common drive element which is movable by an adjustment distance, and in a first adjustment position moves the locking body or bodies for merely one door of the at least two doors of the housing or the locking body or bodies of merely a first group of two groups of doors of the at least two doors of the housing into an unlocking position, and in a second adjustment position moves the locking bodies for all of the doors into an unlocking position, and
   locking units, wherein one or more respective locking units of the locking units are controllable to unlock one door of the at least two doors of the housing or a first group of two groups of doors of the at least two doors of the housing which is/are respectively assigned to said locking units, and respective locking units of the locking units are controllable to unlock all of the doors of the at least two doors of the housing which are respectively assigned to said locking units,
wherein the housing further comprises:
   an authorization checking processor configured to perform a check of a respective authorization of a person to unlock one or more of the doors of the housing, based on authorization information which is respectively used by the person when providing proof of authorization,
wherein the authorization information comprises authorization characteristic variables, wherein one of the authorization characteristic variables is information indicative of which door(s) of the at least two doors of the housing or group(s) of doors of the at least two doors of the housing can be opened with the authorization information, wherein the one of the authorization characteristic variables is a flag that indicates whether the authorization information is first authorization information or second authorization information, wherein the flag has the meaning of a single bit, and wherein the authorization information further comprises checking information resulting from a cryptographic operation with a key on the authorization characteristic variables, and
wherein the housing further comprises either
   a controller configured to control a drive assigned to the common drive element depending on a result of the check performed by the authorization checking processor, in such a way that the common drive element assumes the first adjustment position if the first authorization information was used by the person when providing proof of authorization, and assumes the second adjustment position if the second authorization information was used by the person when providing proof of authorization, or
   a controller configured to control
      the one or more respective locking units to unlock the one door of the at least two doors of the housing or the first group of the two groups of doors of the at least two doors of the housing which is/are respectively assigned to said locking units if the first authorization information was used by the person when providing proof of authorization, and
      the respective locking units to unlock all of the doors of the at least two doors of the housing which are respectively assigned to said locking units if the second authorization information was used by the person when providing proof of authorization, so that in case of using the first authorization information, only the one door of the at least two doors of the housing or the first group of the two groups of doors of the at least two doors of the housing is unlocked and in case of using the second authorization information, all doors of the at least two doors are unlocked.

2. The housing as claimed in claim 1,
wherein the first authorization information is usable by a delivery agent or a group of delivery agents and authorizes said agent/agents to unlock merely the one of the doors or merely the first group of doors of the doors in order to permit said agent/agents to place one or more shipments in the respective housing opening or openings and/or to collect one or more shipments from the respective housing opening or openings, and wherein the second authorization information authorizes at least one person assigned to the housing to unlock all of the doors, in order to permit said at least one person to remove one or more delivered shipments, from the housing opening or openings which is/are assigned to the one door of the at least two doors of the housing or to the first group of the two groups of doors of the at least two doors of the housing, or to place one or more shipments which are to be collected in the housing opening which is/are assigned to the one door of the at least two doors of the housing or to the first group of the two doors of the at least two doors of the housing, and to remove one or more delivered shipments from the housing opening or openings which is/are assigned to a remaining door or remaining doors of the doors.

3. The housing as claimed in claim 1, wherein the authorization checking processor is configured to prevent the one door of the at least two doors of the housing or the first group of the two groups of doors of the at least two doors of the housing from being unlocked twice in direct succession with respective use of the first authorization information.

4. The housing as claimed in claim 1, characterized in that the common drive element is embodied as a rotatable axle which has a first rod part and a second rod part, wherein the first and second rod parts can be releasably secured to one another in such a way that the first and second rod parts rotate together, and in that each locking body is non-movably secured to the first rod part, and in that each locking body is mounted on the second rod part so as to be rotatable about the axle with a defined amount of play.

5. The housing as claimed in claim 4, characterized in that the locking body which is rotatably mounted on the second rod part has a bearing sleeve with a cutout, which bearing sleeve is movably guided on the axle, wherein a pin which protrudes radially from the axle engages in the cutout in the bearing sleeve and as a result defines the play with respect to a rotation of the bearing sleeve on the axle.

6. The housing as claimed in claim 5, characterized in that the pin on the axle is accommodated in a locking position of the locking body in a central region of the cutout which defines the play for the rotation of the bearing sleeve on the axle.

7. The housing as claimed in claim 4, characterized in that one or more locking bodies are arranged on the first and/or second rod part in an axial direction in a mirror-symmetrical fashion with respect to a horizontal central axis of the first and/or second rod part.

8. The housing as claimed in claim 4, characterized in that the first and second rod parts each have coupling pieces at both ends which are constructed symmetrically about a horizontal central axis of each rod part.

9. A method for unlocking one or more doors of a housing as claimed in claim 1, the method comprising:
proving, vis-à-vis the authorization checking processor of the housing, the authorization of the person to unlock one or more doors of the housing by using the first or second authorization information.

10. The method as claimed in claim 9, wherein proving the authorization of the person comprises the following:
inputting the first or second authorization information, or information which was generated using the first or second authorization information, into an input unit of the housing, or
transmitting the first or second authorization information, or information which was generated using the first or second authorization information, to a reception unit of the housing.

11. The method as claimed in claim 9, wherein the first authorization information provides authorization to respectively unlock one or more doors of a plurality of housings.

12. The method as claimed in claim 11, wherein the first authorization information is stored on a portable electronic device.

13. The method as claimed in claim 9, wherein the first authorization information provides authorization for respectively unlocking one or more doors of only one housing, and wherein the first authorization information is stored, together with further first authorization information which provides authorization for respectively unlocking one or more doors of one or more further housings, on a portable electronic device.

14. The method as claimed in claim 9, wherein the first authorization information has a temporally limited validity and/or becomes invalid after a predefined number of uses for proving the authorization.

15. The method as claimed in claim 9, wherein the first authorization information is used to prove the authorization of the person, and wherein the method is a method for unlocking one or more doors of the housing and for using the housing, the method also comprising:
placing one or more shipments in the housing opening or openings which is/are respectively assigned to the one unlocked door or to the first group of unlocked doors, and/or collecting one or more shipments from the housing opening or openings which is/are respectively assigned to the one unlocked door or to the first group of unlocked doors, and
closing the unlocked door or the first group of unlocked doors.

16. The method as claimed in claim 9, wherein the second authorization information is used to prove the authorization of the person, and wherein the method is a method for unlocking one or more doors of the housing and for using the housing, the method also comprising:
removing one or more delivered shipments from the housing opening or openings which is/are assigned to the unlocked door or the first group of unlocked doors, or placing one or more shipments which are to be collected in the housing opening which is/are assigned to the unlocked door or the first group of unlocked doors,
removing one or more delivered shipments from the housing opening or openings which is/are assigned to a remaining unlocked door or remaining unlocked doors, and
closing the unlocked doors.

17. The housing as claimed in claim 1, wherein the key or a corresponding key is known at the housing, and wherein the checking information is a message authentication code, which is computed at the housing over the authorization characteristic variables anew and is compared with a received message authentication code using the key or the corresponding key.

18. The housing as claimed in claim 1, wherein the authorization information has been generated by an administration unit, and wherein the key is known to only the administration unit and the housing.

19. The housing as claimed in claim 1, wherein a further authorization characteristic variable of the authorization characteristic variables is an identifier of the housing or of the locking unit or is an identifier for a group of housings or for their locking units.

20. The housing as claimed in claim 1, wherein a further authorization characteristic variable of the authorization characteristic variables is information relating to a validity period of the authorization information.

21. A housing, having at least two doors for locking respective housing openings, comprising one of:
a locking unit which respectively has for each of the doors a locking element module with at least one locking body and a locking drive for actuating the locking body, wherein the locking drive for the locking element modules has a common drive element which is movable by an adjustment distance, and in a first adjustment position moves the locking body or bodies for merely one door of the at least two doors of the housing or the locking body or bodies of merely a first group of two groups of doors of the at least two doors of the housing into an unlocking position, and in a second adjustment position moves the locking bodies for all of the doors into an unlocking position, and
locking units, wherein one or more respective locking units of the locking units are controllable to unlock one door of the at least two doors of the housing or a first group of two groups of doors of the at least two doors of the housing which is/are respectively assigned to said locking units, and respective locking units of the locking units are controllable to unlock all of the doors of the at least two doors of the housing which are respectively assigned to said locking units,
wherein the housing further comprises:
an authorization checking processor configured to perform a check of a respective authorization of a person to unlock one or more of the doors of the housing, based on authorization information which is respectively used by the person when providing proof of authorization, wherein the authorization information comprises authorization characteristic variables, wherein one of the authorization characteristic variables is information indicative of which door(s) of the at least two doors of the housing or group(s) of doors of the at least two doors of the housing can be opened with the authorization information, wherein a further authorization characteristic variable of the authorization characteristic variables is an identifier of the housing or of the locking unit or is an identifier for a group of housings or for their locking units, and wherein the authorization information further comprises checking information resulting from a cryptographic operation with a key on the authorization characteristic variables, and
wherein the housing further comprises either
a controller configured to control a drive assigned to the common drive element depending on a result of the check performed by the authorization checking processor, in such a way that the common drive element assumes the first adjustment position if first authorization information was used by the person when providing proof of authorization, and assumes the second adjustment position if second authorization information was used by the person when providing proof of authorization, or
a controller configured to control
the one or more respective locking units to unlock the one door of the at least two doors of the housing or the first group of the two groups of doors of the at least two doors of the housing which is/are respectively assigned to said locking units if first authorization information was used by the person when providing proof of authorization, and
the respective locking units to unlock all of the doors of the at least two doors of the housing which are respectively assigned to said locking units if second authorization information was used by the person when providing proof of authorization, so that in case of using the first authorization information, only the one door of the at least two doors of the housing or the first group of the two groups of doors of the at least two doors of the housing is unlocked and in case of using the second authorization information, all doors of the at least two doors are unlocked.

22. The housing as claimed in claim 21, wherein the first authorization information is usable by a delivery agent or a group of delivery agents and authorizes said agent/agents to unlock merely the one of the doors or merely the first group of doors of the doors in order to permit said agent/agents to place one or more shipments in the respective housing opening or openings and/or to collect one or more shipments from the respective housing opening or openings, and wherein the second authorization information authorizes at least one person assigned to the housing to unlock all of the doors, in order to permit said at least one person to remove one or more delivered shipments, from the housing opening or openings which is/are assigned to the one door of the at least two doors of the housing or to the first group of the two groups of doors of the at least two doors of the housing, or to place one or more shipments which are to be collected in the housing opening which is/are assigned to the one door of the at least two doors of the housing or to the first group of the two groups of doors of the at least two doors of the housing, and to remove one or more delivered shipments from the housing opening or openings which is/are assigned to a remaining door or remaining doors of the doors.

23. The housing as claimed in claim 21, wherein the key or a corresponding key is known at the housing, and wherein the checking information is a message authentication code, which is computed at the housing over the authorization characteristic variables anew and is compared with a received message authentication code using the key or the corresponding key.

24. The housing as claimed in claim 21, wherein the authorization information has been generated by an administration unit, and wherein the key is known to only the administration unit and the housing.

25. The housing as claimed in claim 21, wherein a further authorization characteristic variable of the authorization characteristic variables is information relating to a validity period of the authorization information.

26. The housing as claimed in claim 21, wherein the one of the authorization characteristic variables is a flag that indicates whether the authorization information is the first authorization information or the second authorization information.

27. The housing as claimed in claim 26, wherein the flag has the meaning of a single bit.

28. A method for unlocking one or more doors of a housing as claimed in claim 21, the method comprising:
- proving, vis-à-vis the authorization checking processor of the housing, the authorization of the person to unlock one or more doors of the housing by using the first or second authorization information.

29. The method as claimed in claim 28, wherein proving the authorization of the person comprises the following:
- inputting the first or second authorization information, or information which was generated using the first or second authorization information, into an input unit of the housing, or
- transmitting the first or second authorization information, or information which was generated using the first or second authorization information, to a reception unit of the housing.

30. The method as claimed in claim 28, wherein the first authorization information provides authorization to respectively unlock one or more doors of a plurality of housings.

31. The method as claimed in claim 30, wherein the first authorization information is stored on a portable electronic device.

32. The method as claimed in claim 28, wherein the first authorization information provides authorization for respectively unlocking one or more doors of only one housing, and wherein the first authorization information is stored, together with further first authorization information which provides authorization for respectively unlocking one or more doors of one or more further housings, on a portable electronic device.

33. The method as claimed in claim 28, wherein the first authorization information has a temporally limited validity and/or becomes invalid after a predefined number of uses for proving the authorization.

34. The method as claimed in claim 28, wherein the first authorization information is used to prove the authorization of the person, and wherein the method is a method for unlocking one or more doors of the housing and for using the housing, the method also comprising:
- placing one or more shipments in the housing opening or openings which is/are respectively assigned to the one unlocked door or to the first group of unlocked doors, and/or collecting one or more shipments from the housing opening or openings which is/are respectively assigned to the one unlocked door or to the first group of unlocked doors, and
- closing the unlocked door or the first group of unlocked doors.

35. The method as claimed in claim 28, wherein the second authorization information is used to prove the authorization of the person, and wherein the method is a method for unlocking one or more doors of the housing and for using the housing, the method also comprising:
- removing one or more delivered shipments from the housing opening or openings which is/are assigned to the unlocked door or the first group of unlocked doors, or placing one or more shipments which are to be collected in the housing opening which is/are assigned to the unlocked door or the first group of unlocked doors,
- removing one or more delivered shipments from the housing opening or openings which is/are assigned to a remaining unlocked door or remaining unlocked doors, and
- closing the unlocked doors.

\* \* \* \* \*